United States Patent
DeSilva et al.

(10) Patent No.: US 9,945,737 B2
(45) Date of Patent: Apr. 17, 2018

(54) METHOD FOR DETERMINING WAVEGUIDE TEMPERATURE FOR ACOUSTIC TRANSCEIVER USED IN A GAS TURBINE ENGINE

(71) Applicant: Siemens Energy, Inc., Orlando, FL (US)

(72) Inventors: Upul P. DeSilva, Oviedo, FL (US); Heiko Claussen, North Brunswick, NJ (US); Karthik Ragunathan, Bangalore (IN)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 15/128,417

(22) PCT Filed: Apr. 21, 2015

(86) PCT No.: PCT/US2015/026784
§ 371 (c)(1),
(2) Date: Sep. 22, 2016

(87) PCT Pub. No.: WO2015/164313
PCT Pub. Date: Oct. 29, 2015

(65) Prior Publication Data
US 2017/0176265 A1     Jun. 22, 2017

Related U.S. Application Data

(63) Continuation-in-part of application No. 14/682,393, filed on Apr. 9, 2015.
(Continued)

(51) Int. Cl.
*G01K 11/22*     (2006.01)
*G01K 13/02*     (2006.01)
(Continued)

(52) U.S. Cl.
CPC .............. *G01K 11/24* (2013.01); *G01F 1/668* (2013.01); *G01K 3/14* (2013.01); *G01K 13/02* (2013.01);
(Continued)

(58) Field of Classification Search
CPC ........ G01K 11/26; G01K 11/22; G01K 13/02; G01K 11/24; G01K 11/32;
(Continued)

(56) References Cited

U.S. PATENT DOCUMENTS 3,595,082 A *   7/1971   Miller, Jr. .............. G01K 11/26
                                                             360/7
4,246,784 A *   1/1981   Bowen .................. G01K 11/22
                                                           374/117
(Continued)

FOREIGN PATENT DOCUMENTS

EP     113961 A1     7/1984
EP     125061 A     11/1984
(Continued)

OTHER PUBLICATIONS

John A. Kleppe, Jim Maskaly and Gary Beam, "The Application of Image Processing to Acoustic Pyrometry," Proceedings, Int'l Conf. on Image Processing (IEEE) (1996).
(Continued)

*Primary Examiner* — Gail Kaplan Verbitsky

(57) ABSTRACT

A method for determining waveguide temperature for at least one waveguide of a transceiver utilized for generating a temperature map. The transceiver generates an acoustic signal that travels through a measurement space in a hot gas flow path defined by a wall such as in a combustor. The method includes calculating a total time of flight for the acoustic signal and subtracting a waveguide travel time from the total time of flight to obtain a measurement space travel
(Continued)

time. A temperature map is calculated based on the measurement space travel time. An estimated wall temperature is obtained from the temperature map. An estimated waveguide temperature is then calculated based on the estimated wall temperature wherein the estimated waveguide temperature is determined without the use of a temperature sensing device.

19 Claims, 21 Drawing Sheets

Related U.S. Application Data

(60) Provisional application No. 61/983,044, filed on Apr. 23, 2014.

(51) Int. Cl.
  G01K 11/24 (2006.01)
  G01K 3/14 (2006.01)
  G01F 1/66 (2006.01)
  G01P 5/24 (2006.01)
(52) U.S. Cl.
  CPC ........ G01P 5/245 (2013.01); G01K 2013/024 (2013.01); G01K 2213/00 (2013.01)
(58) Field of Classification Search
  CPC ......... G01K 2013/024; G01K 11/3206; G01K 2213/00; G01K 2011/324; G01K 2205/00; G01K 3/14; H04B 10/0775
  USPC ..... 374/43, 44, 45, 100, 141, 152, 153, 117, 374/118, 119, 101, 103, 134, 135, 144, 374/131, 130, 137, 166, 29, 30
  See application file for complete search history.

(56) References Cited

U.S. PATENT DOCUMENTS

| | | | |
|---|---|---|---|
| 4,320,666 A | 3/1982 | Redding | |
| 4,336,719 A * | 6/1982 | Lynnworth | G01F 1/002 73/861.27 |
| 4,676,665 A | 6/1987 | Twerdochlib | |
| 4,827,487 A * | 5/1989 | Twerdochlib | G01J 5/0096 310/338 |
| 5,044,769 A * | 9/1991 | Kulczyk | G01K 11/24 248/74.4 |
| 5,115,670 A | 5/1992 | Shen | |
| 5,286,109 A * | 2/1994 | Hanscombe | G01K 11/26 333/142 |
| 5,369,998 A | 12/1994 | Sowerby | |
| 5,824,915 A * | 10/1998 | Hujzer | G01F 1/662 73/644 |
| 5,918,281 A | 6/1999 | Nabulsi | |
| 6,494,105 B1 | 12/2002 | Gallagher | |
| 7,159,472 B1 | 1/2007 | Hastings et al. | |
| 7,795,783 B2 | 9/2010 | Trochesset et al. | |
| 7,853,433 B2 | 12/2010 | He et al. | |
| 7,856,876 B2 * | 12/2010 | Bostrom | G01F 23/2962 73/290 V |
| 8,001,761 B2 | 8/2011 | Myers, Jr. et al. | |
| 8,807,242 B2 * | 8/2014 | Cheng | G01K 11/24 175/428 |
| 9,045,972 B2 * | 6/2015 | Cheng | G01K 11/24 |
| 2004/0194539 A1 | 10/2004 | Gysling | |
| 2007/0151363 A1 | 7/2007 | Ramsesh | |
| 2009/0178490 A1 | 7/2009 | Konzelmann et al. | |
| 2009/0282911 A1 * | 11/2009 | Bostrom | G01F 23/2962 73/290 V |
| 2010/0288055 A1 | 11/2010 | Mueller et al. | |
| 2012/0150413 A1 | 6/2012 | Bunce et al. | |
| 2012/0204620 A1 | 8/2012 | Straub, Jr. | |
| 2014/0130606 A1 | 5/2014 | Schwarz | |
| 2014/0144156 A1 | 5/2014 | Lang et al. | |
| 2014/0278200 A1 | 9/2014 | DeSilva | |
| 2014/0345948 A1 * | 11/2014 | Cheng | G01K 11/24 175/50 |
| 2015/0063411 A1 | 3/2015 | DeSilva et al. | |
| 2015/0128722 A1 * | 5/2015 | Ajay | G01F 1/667 73/861.04 |
| 2015/0128723 A1 | 5/2015 | Satou et al. | |
| 2015/0168190 A1 | 6/2015 | DeSilva et al. | |
| 2015/0168228 A1 | 6/2015 | DeSilva | |
| 2015/0168229 A1 | 6/2015 | DeSilva | |
| 2015/0168230 A1 | 6/2015 | DeSilva et al. | |
| 2015/0185089 A1 | 7/2015 | DeSilva et al. | |
| 2015/0233747 A1 * | 8/2015 | Mitri | G01F 1/66 73/861.28 |
| 2015/0260557 A1 | 9/2015 | DeSilva et al. | |
| 2015/0260611 A1 | 9/2015 | DeSilva et al. | |
| 2015/0260612 A1 | 9/2015 | DeSilva et al. | |
| 2016/0341606 A1 * | 11/2016 | Gleeson | G01K 11/22 |

FOREIGN PATENT DOCUMENTS

| | | | |
|---|---|---|---|
| EP | 1602904 A1 | 5/2005 | |
| EP | 2290343 A2 | 3/2011 | |
| JP | 361045942 A * | 1/1986 | |
| JP | 61045942 A * | 3/1986 | ............ G01K 11/24 |
| JP | 2001141578 A | 5/2001 | |
| JP | 2002156294 A | 5/2002 | |
| WO | 93/04343 A1 | 3/1994 | |

OTHER PUBLICATIONS

G.Q. Shen, L.S.An, and G.S. Jiang, "Real-time Monitoring on Boiler Combustion Based on Acoustic Measurement", Power India Conference, (IEEE) (2006).
Helmut Sielschott and Willy Derichs, "Use of collocation methods under inclusion of a priori information in acoustic pyrometry", Process Tomography—95 Implementation for Industrial Processes, Proc. European Concerted Action on Process Tomography, Bergen, Norway, Apr. 6-8, 1995.
Upul DeSilva, Richard H. Bunce and Heiko Claussen, "Novel Gas Turbine Exhaust Temperature Measurement System", Proceedings of ASME Turbo Expo 2013, Jun. 3, 2013.
International Search Report for International Application No. PCT/US2015/026784 dated Jun. 29, 2015, 3 pages.
Written Opinion for International Application No. PCT/US2015/026784 dated Jun. 29, 2015, 7 pages.

* cited by examiner

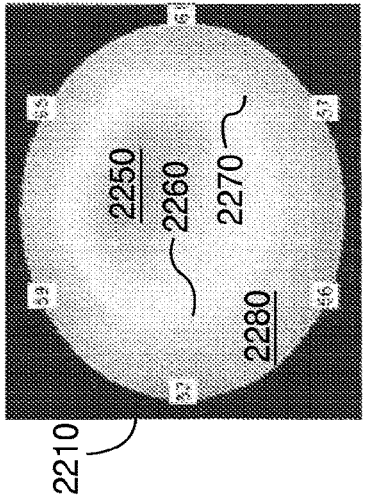
FIG. 25
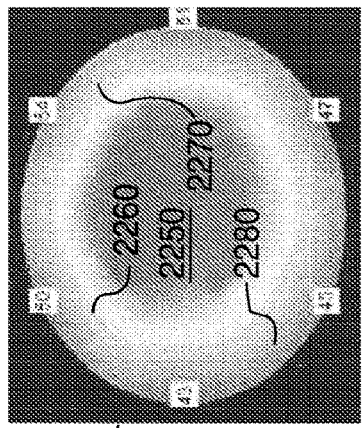
FIG. 26
FIG. 27
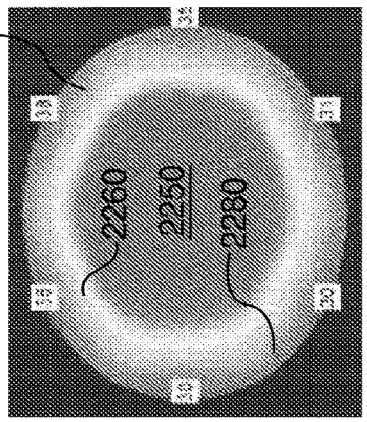
FIG. 28
FIG. 29
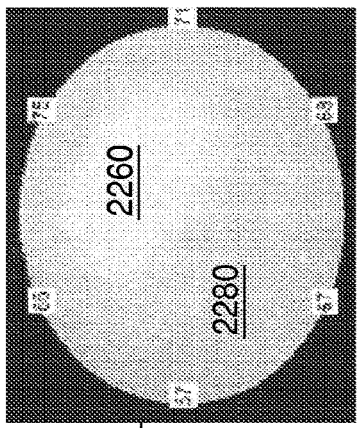
FIG. 30
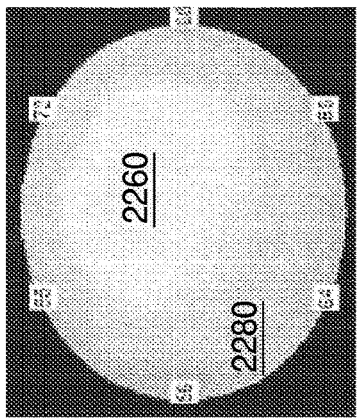

METHOD FOR DETERMINING WAVEGUIDE TEMPERATURE FOR ACOUSTIC TRANSCEIVER USED IN A GAS TURBINE ENGINE

CROSS-REFERENCE TO RELATED APPLICATIONS

This application is a U.S. national stage application and claims the benefit under 35 U.S.C. § 371 of International Application No. PCT/US2015/026784 filed on Apr. 21, 2015 and entitled METHOD FOR DETERMINING WAVEGUIDE TEMPERATURE FOR ACOUSTIC TRANSCEIVER USED IN A GAS TURBINE ENGINE which is incorporated by reference in its entirety and to which this application claims the benefit of priority. International Application No. PCT/US2015/026784 is a continuation in part of copending United States Patent Application entitled "PARAMETER DISTRIBUTION MAPPING IN A GAS TURBINE ENGINE", filed on Apr. 9, 2015, U.S. application Ser. No. 14/682,393, which is incorporated herein by reference in its entirety and to which this application claims the benefit of priority. International Application No. PCT/US2015/026784 also claims the benefit under 35 U.S.C. § 119(e) of U.S. Provisional Patent Application No. 61/983,044 entitled "TEMPERATURE DISTRIBUTION MAPPING IN A GAS TURBINE COMBUSTOR", filed on Apr. 23, 2014, which is incorporated herein by reference in its entirety and to which this application claims the benefit of priority.

STATEMENT REGARDING FEDERALLY SPONSORED RESEARCH OR DEVELOPMENT

Temperature mapping portions of this invention were made with government support under contract DE-FC26-05NT42644 awarded by the U.S. Department of Energy. The government may have certain rights in the invention.

This application incorporates by reference the following co-pending United States utility patent applications in their entirety as if fully set forth herein:

"Nonintrusive Performance Measurement of a Gas Turbine Engine in Real Time", filed on Jul. 28, 2014, Ser. No. 14/341,950; U.S. Patent Publication No. 2015/0260557;

"Nonintrusive Transceiver and Method for Characterizing Temperature and Velocity Fields in a Gas Turbine Combustor", filed on Jul. 28, 2014, Ser. No. 14/341,924; U.S. Patent Publication No. 2015/0260611;

"Active Measurement Of Gas Flow Temperature, Including In Gas Turbine Combustors", filed on Mar. 13, 2014, Ser. No. 14/207,741; U.S. Patent Publication No. 2015/0168230;

"Active Temperature Monitoring In Gas Turbine Combustors", filed on Dec. 18, 2013, Ser. No. 14/132,001; U.S. Patent Publication No. 2015/0168229;

"Multi-Functional Sensor System For Gas Turbine Combustion Monitoring And Control" filed on Dec. 18, 2013, Ser. No. 14/109,992; U.S. Patent Publication No. 2015/0168228;

"Temperature Measurement In A Gas Turbine Engine Combustor", filed on Mar. 14, 2013, Ser. No. 13/804,132; U.S. Patent Publication No. 2014/0278200 and "Gas Turbine Engine Control Using Acoustic Pyrometry", filed on Dec. 14, 2010, Ser. No. 12/967,148; U.S. Patent Publication No. 2012/0150413, U.S. Pat. No. 8,565,999.

This application also incorporates by reference in its entirety as if fully set forth herein U.S. Pat. No. 7,853,433, "Combustion Anomaly Detection Via Wavelet Analysis Of Dynamic Sensor Signals", issued Dec. 14, 2010.

BACKGROUND OF THE INVENTION

1. Field of the Invention

The invention relates to the mapping of a parameter in two-dimensional space and to active measurement of gas flow parameters, such as gas flow temperature or velocity, in flow regions of gas turbine engines. Such engines include, by way of example, industrial gas turbine (IGT) engines, other types of stationary gas turbine, marine, aero and other vehicular gas turbine engines. More particularly, embodiments disclosed herein disclose a method for determining a waveguide temperature for at least one waveguide in order to include the effect of boundary wall and waveguide temperatures on a temperature distribution of a temperature map, wherein the method includes calculating an estimated waveguide temperature based on an estimated wall temperature and wherein the estimated wall temperature is determined without the use of a temperature sensing device.

2. Description of the Prior Art

Combustion turbines, such as gas turbine engines for any end use application, generally comprise a compressor section, a combustor section, a turbine section and an exhaust section. In operation, the compressor section inducts and compresses ambient air. The combustor section generally may include a plurality of combustors for receiving the compressed air and mixing it with fuel to form a fuel/air mixture. The fuel/air mixture is combusted by each of the combustors to form a hot working gas that may be routed to the turbine section where it is expanded through alternating rows of stationary airfoils and rotating airfoils and used to generate power that can drive a rotor. The expanding gas exiting the turbine section can be exhausted from the engine via the exhaust section.

Combustion anomalies, such as flame flashback, have been known to occur in combustion sections of gas turbine engines. Flame flashback is a localized phenomenon that may be caused when a turbulent burning velocity of the air and fuel mixture exceeds an axial flow velocity in the combustor assembly, thus causing a flame to anchor onto one or more components in/around the combustor assembly, such as a liner disposed around the combustion chamber. The anchored flame may burn through the components if a flashback condition remains for extended periods of time without correction thereof. Thus, flame flashback and/or other combustion anomalies may cause undesirable damage and possibly even destruction of combustion engine components, such that repair or replacement of such components may become necessary.

The fuel/air mixture at the individual combustors is controlled during operation of the engine to maintain one or more operating characteristics within a predetermined range, such as, for example, to maintain a desired efficiency and/or power output, control pollutant levels, prevent pressure oscillations and prevent flameouts. In a known type of control arrangement, a bulk turbine exhaust temperature may also be monitored as a parameter that may be used to monitor the operating condition of the engine. For example, a controller may monitor a measured turbine exhaust temperature, and a measured change in temperature at the exhaust may result in the controller changing an operating condition of the engine. In other known types of control arrangements discrete pitot-static or multi hole pressure probes are utilized to determine gas flow velocity at specific locations, but grid arrays of such probes disrupt gas flow and introduce measurement errors. Due to such gas flow disruptions, grid arrays, when employed, have limited numbers of widely spaced probes, which provide relatively coarse gas flow velocity distribution and profile information.

At present, there are several different types of sensors and sensing systems that are being used in the industry for monitoring combustion and maintaining stability of the combustion process for engine protection. For example, dynamic pressure sensors are being used for combustion stability and resonance control. Passive visual (optical visible light and/or infrared spectrum) sensors, ion sensors and Geiger Mueller detectors are used to detect flame on/off in the combustor, while thermocouples are being used for flashback detection. With respect to known combustion gas flow velocity (u) monitoring methods, pitot-static and multi hole pressure probes utilize differential pressure techniques, hot wire probes utilize thermal anemometry techniques, while Laser Doppler and Particle Image Velocimetry systems utilize optical techniques to characterize gas flow velocities. Differential pressure and thermal anemometry instruments are intrusive point measurement devices that disturb local gas flow around the instruments. Laser Doppler and Particle Image Velocimetry instruments respectively provide non-intrusive point and 2- or 3-dimensional non-intrusive gas flow velocity measurement although they both require particle seeding of the flow. In addition, sophisticated laser based measurements such as Filtered Rayleigh Scattering (FRS) and other such laser spectroscopy based techniques have been deployed to measure gas velocity. However, these techniques are more complex than intrusive differential pressure or thermal anemometry instruments and require more specialized training to implement in monitoring systems. Moreover, most optical techniques for velocity are geared towards laboratory environments rather than in operative engines at power plant field sites. With respect to temperature (T) monitoring techniques, known Raman Spectroscopy, Laser Induced Fluorescence (for both u and T monitoring), and Coherent Anti-Stokes Raman Spectroscopy (CARS) (for both u and T monitoring) instrumentation systems are also intended for laboratory environments, rather than for field use in fossil power generation equipment. Tunable Diode Laser Absorption Spectroscopy (TDLAS) instrumentation is used in some industrial power generation field applications, such as for temperature measurement in boilers but that instrumentation is extremely costly: approximately US $500,000 per system. Other types of temperature measurement and combustion anomaly detection systems have had greater acceptance in power generation industry field applications.

Particularly, U.S. Pat. No. 7,853,433 detects and classifies combustion anomalies by sampling and subsequent wavelet analysis of combustor thermoacoustic oscillations representative of combustion conditions with sensors, such as dynamic pressure sensors, accelerometers, high temperature microphones, optical sensors and/or ionic sensors. United States Publication No. US2012/0150413 utilizes acoustic pyrometry in an IGT exhaust system to determine upstream bulk temperature within one or more of the engine's combustors. Acoustic signals are transmitted from acoustic transmitters and are received by a plurality of acoustic receivers. Each acoustic signal defines a distinct line-of-sound path between a corresponding transmitter and receiver pair. Transmitted signal time-of-flight is determined and processed to determine a path temperature. Multiple path temperatures can be combined and processed to determine bulk temperature at the measurement site. The determined path or bulk temperature or both can be utilized to correlate upstream temperature in the combustor. Co-pending U.S. utility patent application Ser. No. 13/804,132 calculates bulk temperature within a combustor, using a so-called dominant mode approach, by identifying an acoustic frequency at a first location in the engine upstream from the turbine (such as in the combustor) and using the frequency for determining a first bulk temperature value that is directly proportional to the acoustic frequency and a calculated constant value. A calibration second temperature of the working gas is determined in a second location in the engine, such as the engine exhaust. A back calculation is performed with the calibration second temperature to determine a temperature value for the working gas at the first location. The first temperature value is compared to the back calculated temperature value to change the calculated constant value to a recalculated constant value. Subsequent first temperature values at the combustor may be determined based on the recalculated constant value.

A need exists for techniques for creating real time, two-dimensional maps of temperature distribution in a flow region of a gas turbine engine based on estimates of average temperature along lines between transceivers and that include the effect of boundary wall and waveguide temperatures on temperature distribution of the two-dimensional temperature map.

A further need exists in the art for an integrated gas turbine engine monitoring and control system for measuring gas flow velocity, temperature and detecting a broad range of possible combustor failures or, more satisfactorily, precursors to faults, during combustion, sharing common sensors and, if desired, a common controller.

Another need exists in the art for a gas turbine engine active velocity and temperature monitoring system that maps actual combustor velocity and temperature in real time without the need to obtain reference temperatures from other locations within the engine, such as known bulk temperature systems that back calculate combustor temperature based on temperature measurements obtained in the engine exhaust system.

An additional need exists for an active gas flow velocity and temperature monitoring system that shares sensors commonly used with combustion turbine monitoring and control systems, so that active velocity and temperature monitoring can be integrated within the monitoring and control system.

A further need exists for a technique for providing real-time temperature information in a plane transverse to a gas flow in a turbine engine for controlling the engine.

Another need exists for a technique for controlling a gas turbine combustor based on average temperature measurements along lines in a plane transverse to the combustor flow.

SUMMARY OF THE INVENTION

A method is disclosed for determining a waveguide temperature for at least one waveguide used in conjunction with a transceiver utilized for generating a gas turbine temperature map. The transceiver generates an acoustic signal that travels through a measurement space in a hot gas flow path defined by a wall such as in a combustor. The method includes calculating a total time of flight wherein the total time of flight includes a travel time through the measurement space and a travel time through the waveguide. The waveguide travel time is then subtracted from the total time of flight to obtain a measurement space travel time. The method also includes calculating a temperature map based on the measurement space travel time and then obtaining an estimated wall temperature from the temperature map. Further, the method includes calculating an estimated waveguide temperature based on the estimated wall temperature wherein the estimated waveguide temperature is determined without the use of a temperature sensing device.

In addition, a method for determining a waveguide temperature for at least one waveguide used in conjunction with a transceiver utilized for generating a gas turbine temperature map is disclosed. The transceiver generates an acoustic signal that travels through a measurement space in a hot gas flow path defined by a wall such as in a combustor. The method includes dividing the wall into a plurality of boundary portions wherein a transceiver and waveguide is associated with each boundary portion. The method also includes calculating a total time of flight for the acoustic signal wherein the total time of flight includes a travel time through the measurement space and a travel time through the waveguide. The waveguide travel time is then subtracted from the total time of flight to obtain a measurement space travel time. In addition, the method includes calculating a temperature map based on the measurement space travel time and then obtaining from the temperature map an estimated temperature for each boundary portion. Further, the method includes calculating an estimated waveguide temperature for each boundary portion wherein the estimated waveguide temperature is determined without the use of a temperature sensing device.

The respective objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIGS. 25-30 depict a sequence of exemplary temperature maps that illustrate temperature convergence for a waveguide as the number of iterations increase.

To facilitate understanding, identical reference numerals have been used, where possible, to designate identical elements that are common to the figures.

DETAILED DESCRIPTION

Figure 1:
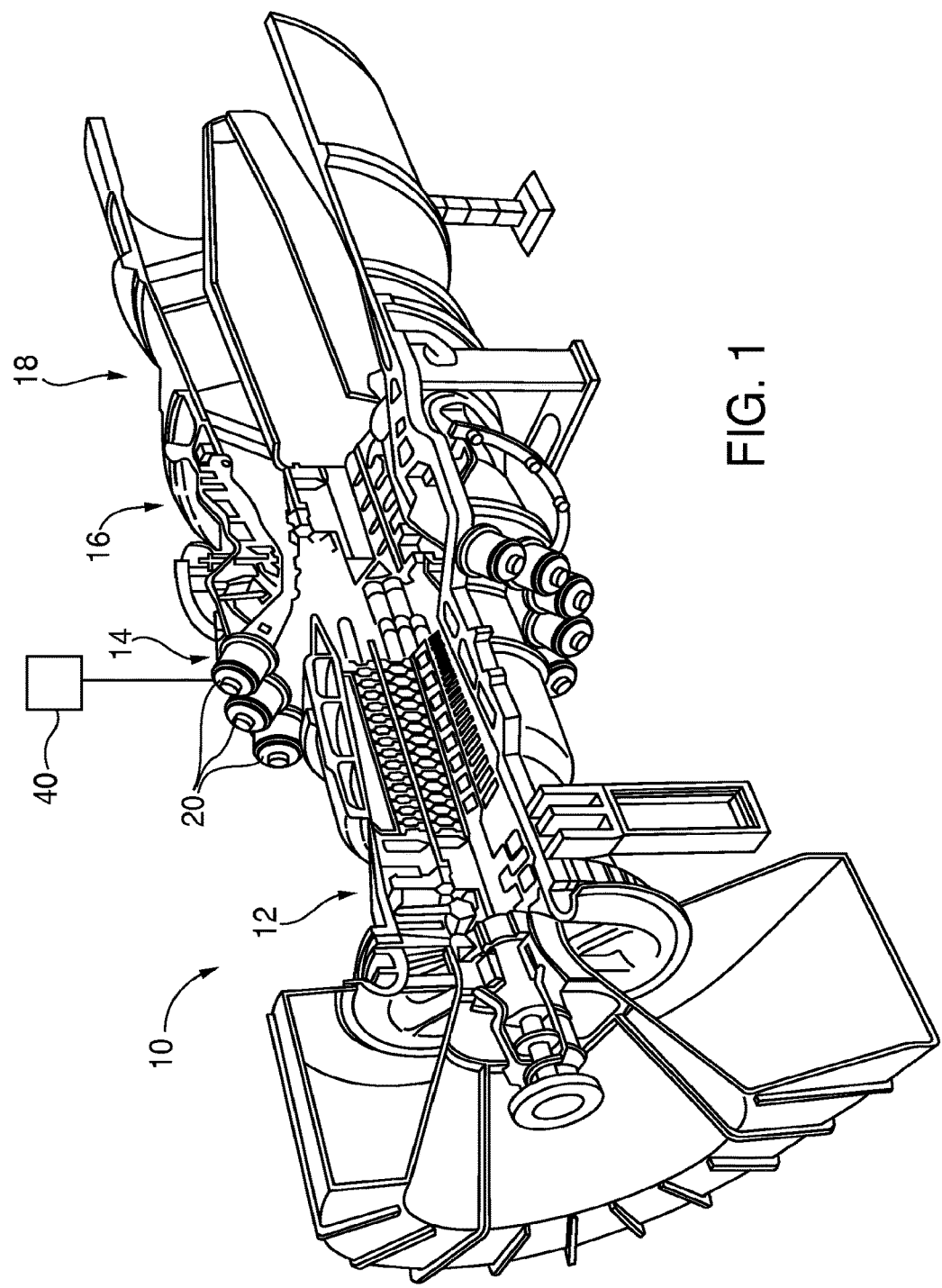
FIG. 1 is a perspective cross-sectional view of a gas turbine engine illustrating implementation of a system for determining combustor gas flow active velocity and temperature measurement, in accordance with embodiments of the invention.

After considering the following description, those skilled in the art will clearly realize that the teachings of the invention can be readily utilized for active acoustic velocity and pyrometry-based gas flow velocity and temperature measurement. Embodiments of the invention are used for monitoring of gas turbine combustors, including industrial gas turbine (IGT) combustors by incorporating them into the combustion monitoring and control system by addition of an acoustic transmitter or acoustic transceiver that transmits sound waves through gas flow in a line-of-sight with a plurality of acoustic sensors, such as dynamic pressure sensors. For velocity measurement, sound transmission time-of-flight that is directed generally transversely through the gas flow path is measured by the controller and correlated with gas flow velocity along the line-of-sight. The gas flow velocity determination includes compensation for impact of the thermodynamically interrelated temperature, gas constant and speed of sound influences on the first time-of-flight, in order to determine absolute gas flow velocity.

In an integrated acoustic pressure-based sensor and monitoring/control system embodiment, the controller correlates velocity and, if desired, absolute active path temperatures simultaneously with acoustic transmission and time-of-flight analysis techniques. Where velocity and temperature are measured simultaneously the absolute active path temperature is utilized to compensate for the aforementioned thermodynamic influences on gas flow absolute velocity. Alternatively in other embodiments the speed of sound influence on the first time-of-flight is utilized to determine absolute gas flow velocity rather than absolute active path temperature. In such embodiments, compensation for the speed of sound in the velocity monitoring is accomplished by substituting for the first transmitters a set of first transceiver/transducers that are capable of transmitting and receiving acoustic signals, and generating output signals and substituting for the first sensors a set of second transducers that are capable of transmitting and receiving acoustic signals and generating output signals. Acoustic signals are transmitted and received from the first to the second transducers and time-of-flight is determined. A reverse acoustic signal is transmitted from the second to the first transducers and the reverse time-of-flight is determined. The respective first and first reversed acoustic signals times-of-flight are used to determine the speed of sound c. The determined speed of sound c is then utilized for determination of the actual gas flow velocity.

In embodiments of the invention active velocity or active velocity/temperature measurements are used as monitoring parameters for gas flow in a combustion monitoring and control system that can identify and classify gas flow anomalies (e.g., combustion anomalies), for example by using wavelet or Fourier analysis techniques. Some embodiments of the methods and system incorporate one or more acoustic dynamic pressure transceiver/transducer combination transmitter/sensors that are selectively oriented or arrayed in sequential axial planar positions within the combustor. Known transceiver/transducer component designs and their related controller components have been used reliably and cost effectively in the past in power generation field service. By reconfiguring those types of known components into the gas flow control and monitoring systems of the present invention combustion turbine and other combustion power generation equipment can be monitored and controlled with simpler instrumentation hardware configurations that provide detailed active gas flow velocity and temperature distribution information useful for precise combustion control.

Monitoring and Control System Structure

Figure 2:
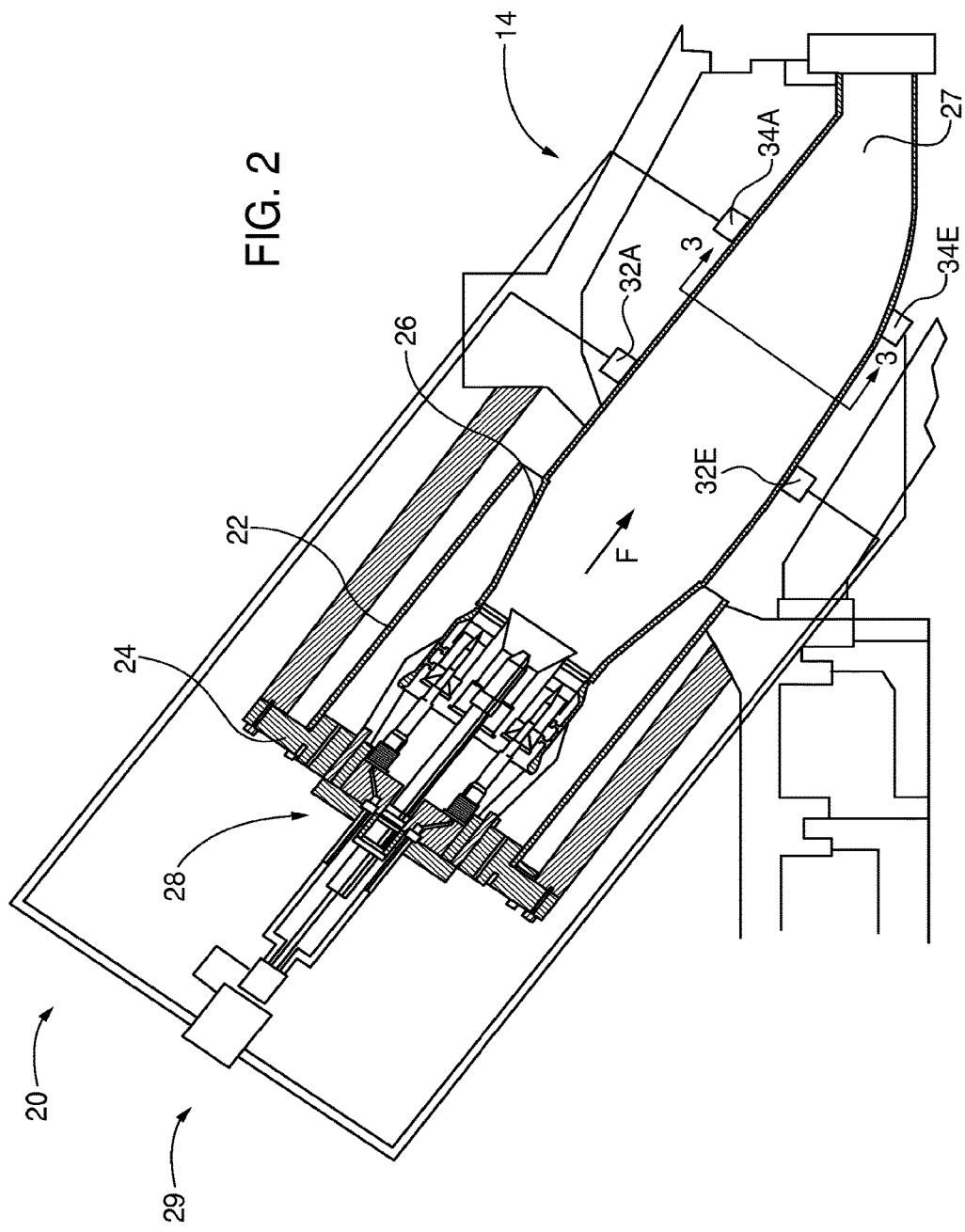
FIG. 2 is a cross-sectional view of a gas turbine combustor incorporating an embodiment of a monitoring system for determining combustor gas flow active velocity and temperature measurement, in accordance with embodiments of the invention.

Referring to FIGS. 1 and 2 an exemplary industrial gas turbine engine 10 is shown. The exemplary engine 10 includes a compressor section 12, a combustor section 14, a turbine section 16, and an exhaust section or system 18. The combustor section 14 includes a plurality of combustors 20. Each combustor 20 has a combustion shell 22 and a cover plate 24. The combustor liner or basket 26 and transition duct 27 define a passage for conveying hot working gas that flows in the direction F to the turbine section 16. The system of the present invention is operable with known combustor geometry gas turbine engine designs, including can, can-annular or annular construction combustors in stationary land-based or vehicular applications.

During operation of the engine 10, compressed air from the compressor section 12 is provided to the combustor section 14 where it is combined with fuel supplied by fuel injection system 28 in the combustors 14. The fuel/air mixture is ignited to form combustion products comprising the hot working gas. It may be understood that combustion of the fuel and air may occur at various axial locations along the passage through the combustor liner or basket 26 and the transition duct 27 to the inlet of the turbine section 16. The hot working gas is expanded through the turbine section 16 and is exhausted through the exhaust section/system 18.

Referring to FIGS. 1 and 2, in accordance with an aspect of the invention, a combustion monitoring and control system 29 is provided, which can identify and classify combustion anomalies and actively control the gas turbine combustion process within one or more of the engine 10 combustors 20. In this regard, the engine 10 may include may comprise one or more of the monitoring and control system(s) 29: e.g., one system 29 for each combustor 20, or a single system 29 may service each combustor 14 of the engine 10. Similarly, clusters of combustors 20 may be served by one system 29, with other cluster(s) being served by other systems. Thus the consolidated monitoring system for an engine 10 can determine deviations between respective combustors and compare their relative performance no matter what engine combustor structure or orientation is employed by the engine design: whether a stationary, land-based turbine engine or a vehicular engine for aero, marine or land vehicular applications.

Figure 5:
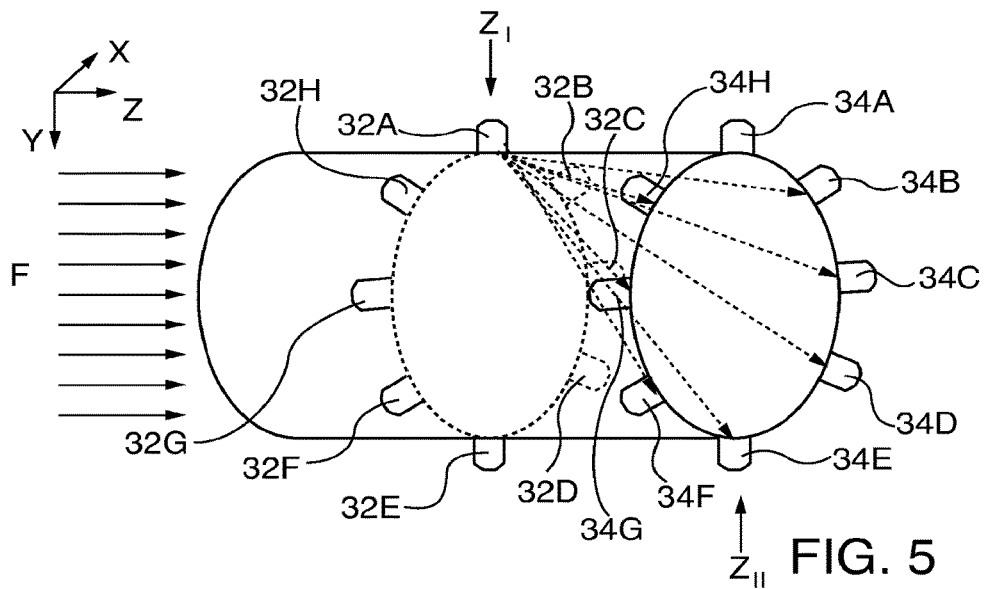
FIG. 5 is a schematic perspective view of exemplary sonic sensor arrays used by the gas flow monitoring system to measure gas flow velocity in a gas turbine combustor, in accordance with embodiments of the invention.
Figure 9:
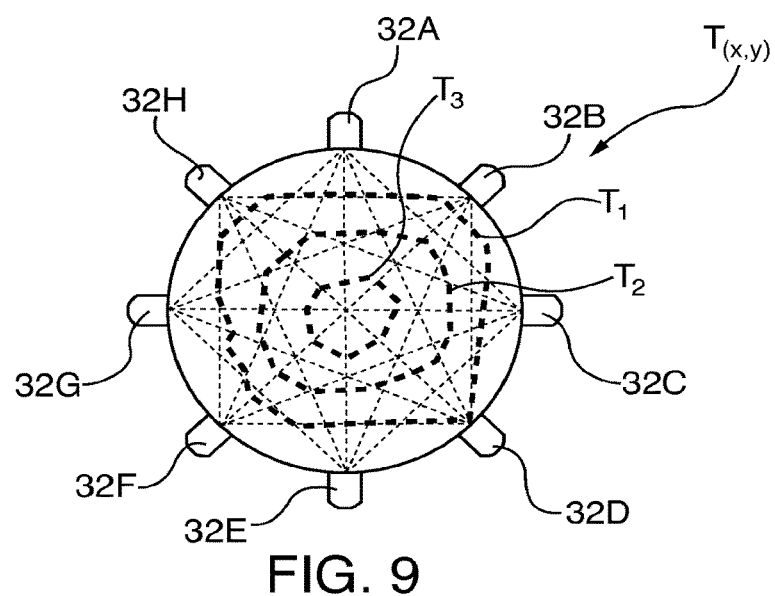
FIG. 9 is a schematic perspective view of exemplary sonic sensor arrays used to measure gas flow temperature in a gas turbine combustor, in accordance with embodiments of the invention.

As shown in FIGS. 2, 3, 5 and 9 the system 29 includes an array of a plurality of known acoustic transceiver/transducers 32A-H and 34A-H that are capable of transmitting and receiving acoustic oscillation waves along exemplary the line-of-sight paths shown in dashed lines in FIGS. 5 and 9. The transceiver/transducer arrays 32, 34 are capable of generating respective sensor output signals indicative of combustion thermoacoustic oscillations in each respective monitored and controlled combustor 20. Other system embodiments can be constructed with at least two, but preferably more acoustic sensors, whether functionally part of a transceiver component or as a stand-alone component. Acoustic frequencies and amplitudes sensed by those acoustic sensor portions of the transceivers are generated as a result of combustion events in the working combustion gas, defining acoustic sources that occur within the combustor 20 hot gas path. The monitoring and control system 29 is configured to transform the sensed thermoacoustic oscillation information into a form that enables the occurrence of combustion anomalies of interest to be discerned. As such, flame flashback events and other types of combustion anomalies of interest may be detected and extracted from sensed thermoacoustic oscillations in the combustor 14 that are monitored by the transceiver/transducer/sensors positioned in and/or around the combustor 14. Depending upon the system 29 configurations and application, the acoustic sensors comprise any combination of one or more of a dynamic pressure sensor, a microphone, an optical sensor or an ionic turbine inlet sensor. Pressure sensors sense the amplitudes of thermoacoustic oscillations in the combustor 20 as well as pulsation frequencies. A high temperature microphone may be utilized to measure acoustic fluctuations in the combustor 14. An optical sensor may be utilized to measure a dynamic optical signal within the combustor 20. An ionic sensor may be utilized to measure dynamic ionic activity within the combustor 20.

Figure 3:
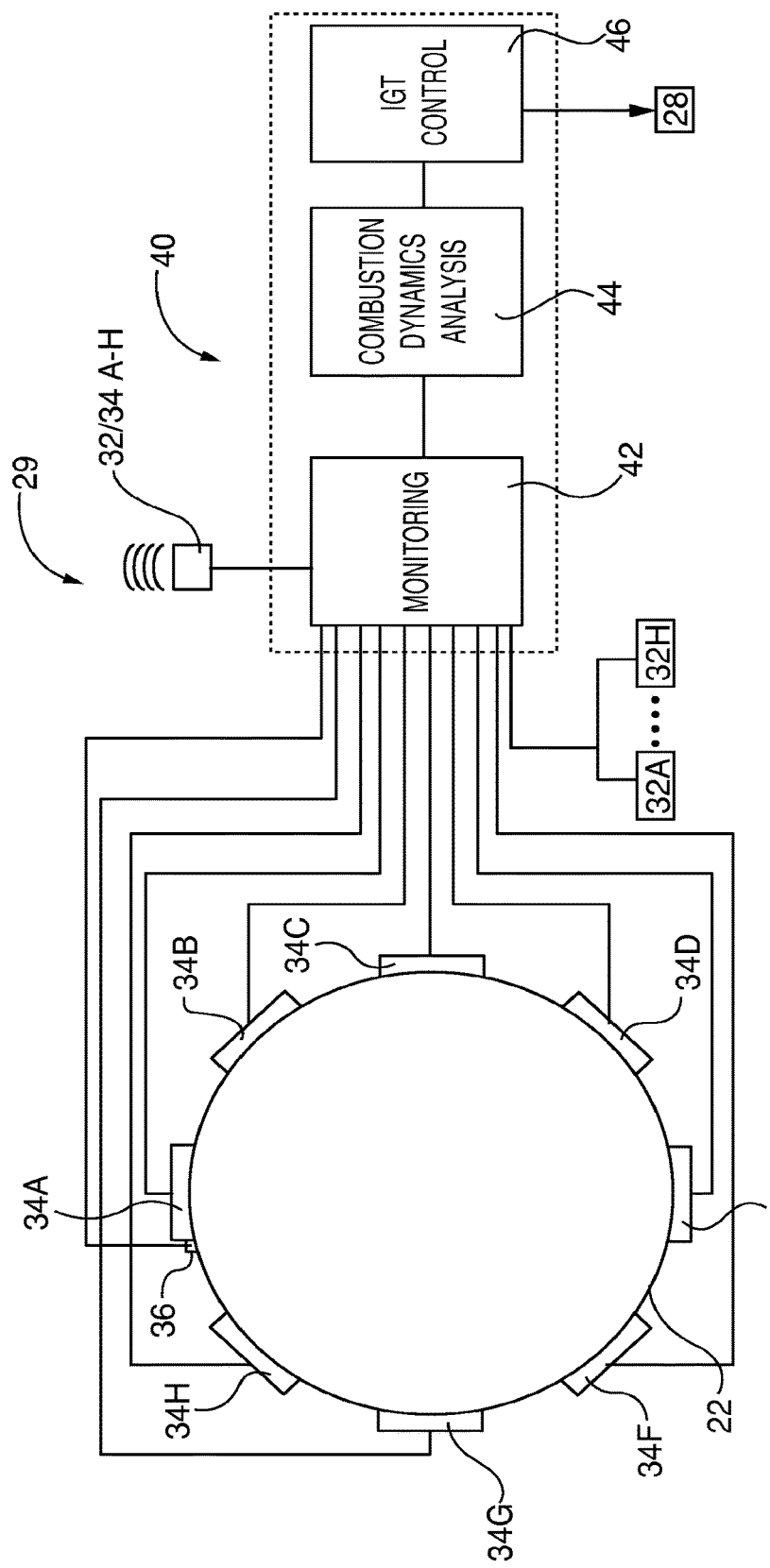
FIG. 3 is a cross-sectional view of the system of FIG. 2, taken along 3-3 thereof, in accordance with aspects of the invention.

An exemplary acoustic sensor array shown schematically in FIGS. 2, 3, 5 and 9 comprises transceiver/transducers 32A-H and 34A-H that function as at least one acoustic transmitter that transmits in turn to at least one and preferably a plurality of the dynamic pressure sensors in the array. The transceiver/transducers 32, 34 are arrayed axially and radially within the combustor 20 by known mounting structures and methods, such as J tubes or rakes, within the combustor shell 22 proximal the combustor basket or liner 26, and/or proximal the transition 27 junction with the turbine section 16. In FIG. 3 the sensors are radially/circumferentially arrayed transceivers 34A-34H that are capable of transmitting and receiving acoustic oscillation waves along the line-of-sight paths similar to the transceivers 32A-H shown in dashed lines in FIG. 9. Other types of known sensors, such as individual thermocouple temperature sensors or thermocouple arrays may be employed within the gas turbine engine. For example in FIG. 3 thermocouple 36 measures combustion temperature in the combustor 20. While exemplary three-dimensional annular combustion flow paths and axially spaced, two-dimensional circular-annular transceiver/transducer arrays are shown in the figures, other combustion flow path and array orientations may be utilized, in practicing embodiments of the invention, including square- or rectangular-shaped geometries.

Figure 4:
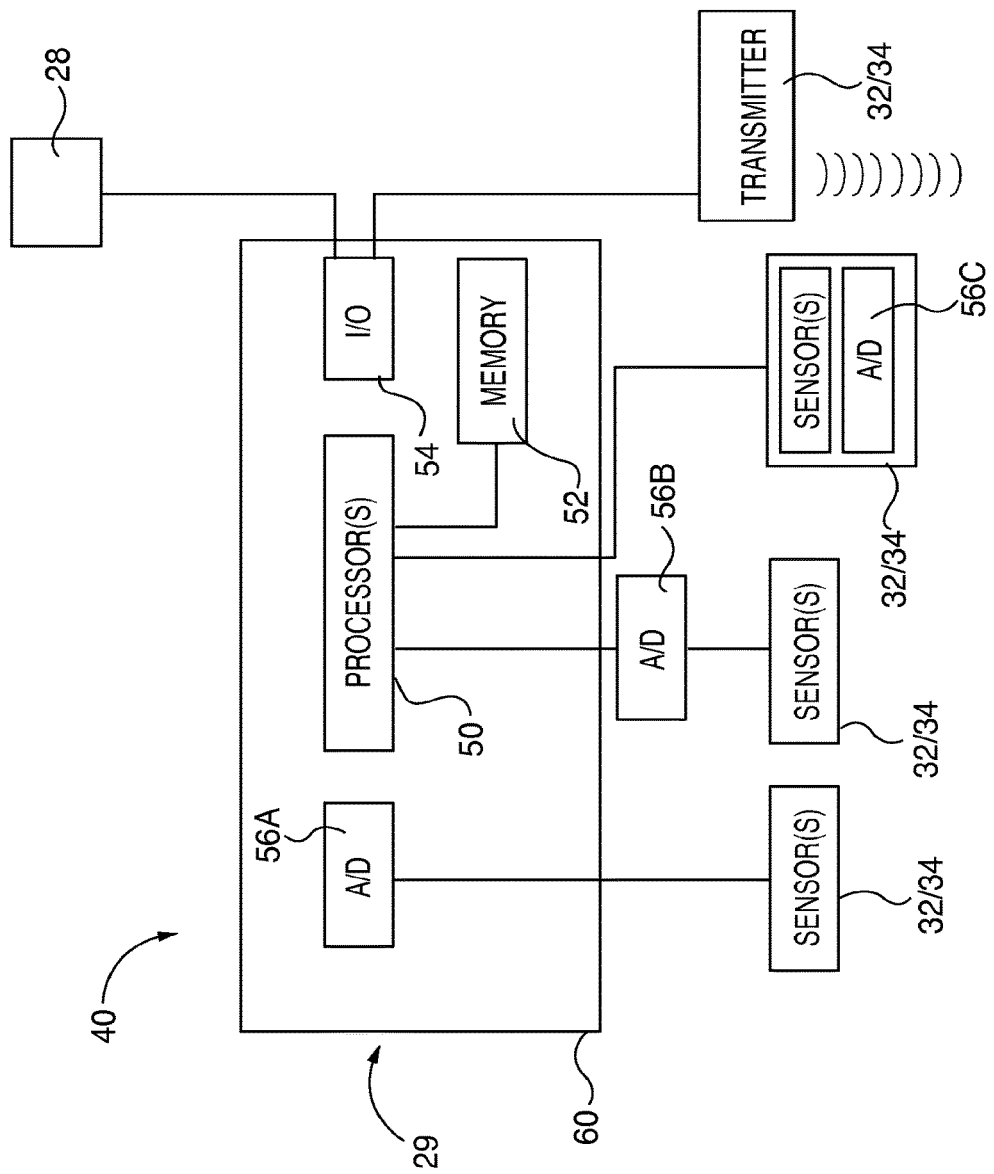
FIG. 4 is a block diagram of an embodiment of a controller for implementing embodiments of the present invention in the monitoring system for determining combustor gas flow active velocity and temperature measurement, in accordance with embodiments of the invention.

As shown in greater detail in FIGS. 3 and 4, the monitoring and control system 29 comprises a known controller 40, coupled to the transceiver/transducers 32, 34, that is capable of correlating sensor output signals with gas flow velocity and combustion temperature in a monitoring section 42 and conducting combustion dynamics analysis of the combustion process in an analysis section 44. The monitoring section 42 and dynamic analysis 44 section outputs are utilized by the gas turbine control system 46 that can send control signals to other gas turbine controls subsystems, including industrial gas turbine (IGT) controls subsystems, such as the fuel injection system 28, in order to unload or shut down the engine 10 in response to changes in monitored combustion conditions within the combustor 20.

Referring to the exemplary controller 40 embodiment shown in FIG. 4, it includes one or more processors 50, system memory 52 and input/output control devices 54 for interfacing with the associated engine 10 controls, such as the fuel injection control system 28, and the acoustic transceiver/transducer 32, 34 acoustic transmitters and sensors 32 (or functionally equivalent performing separate discrete transmitters and receiver sensors), networks, other computing devices, human machine interfaces for operator/users, etc. The controller 40 may also include one or more analog to digital converters 56A and/or other components necessary to allow the controller 40 to interface with the transceivers 32, 34 and/or other system components to receive analog sensor information. Alternatively, and/or additionally, the system 29 may include one or more analog to digital converters 56B that interface between the transceivers 32, 34 (or functionally equivalent performing separate discrete transmitters and receiver sensors) and the controller 40. As yet a further example, certain transceivers 32, 34 may have an analog to digital converter 56C integral therewith, or are otherwise able to communicate digital representations of sensed information directly to the controller 40.

The processor(s) 50 may include one or more processing devices such as a general purpose computer, microcomputer or microcontroller. The processors 50 may also comprise one or more processing devices such as a central processing unit, dedicated digital signal processor (DSP), programmable and/or reprogrammable technology and/or specialized component, such as application specific integrated circuit (ASIC), programmable gate array (e.g., PGA, FPGA).

The memory 52 may include areas for storing computer program code executable by the processor(s) 50, and areas for storing data utilized for processing, e.g., memory areas for computing wavelet transforms, Fourier transforms or other executed mathematical operations used to operate the monitoring and control system 29, as described more fully herein below. As such, various aspects of the present invention may be implemented as a computer program product having code configured to perform the detection of combustion engine anomalies of interest, combustion dynamics and engine control functions as set out in greater detail herein.

In this regard, the processor(s) 50 and/or memory 52 are programmed with sufficient code, variables, configuration files, etc., to enable the controller 40 to perform its designated monitoring and control functions. For example, the controller 40 may be operatively configured to sense thermoacoustic conditions, analyze thermoacoustic conditions based upon inputs from one or more transceiver/transducers 32, 34, control features of the engine 10 in response to its analysis, and/or report results of its analysis to operators, users, other computer processes, etc. as set out in greater detail herein. Thus, all of the dynamic output signals originating from transceiver/transducers 32, 34 may be communicated to a single processor 50. In this implementation, the single processor 50 will process the sensor dynamic output signals using the data analysis and control functions described in greater detail herein, such that it appears as if the results are computed in a generally parallel fashion. Alternatively, more processors 50 can be used and each processor may be utilized to process one or more transceiver/transducers 32, 34 dynamic signals, e.g., depending for example, upon the computation power of each processor.

Monitoring and Control System Operation

Figure 10:
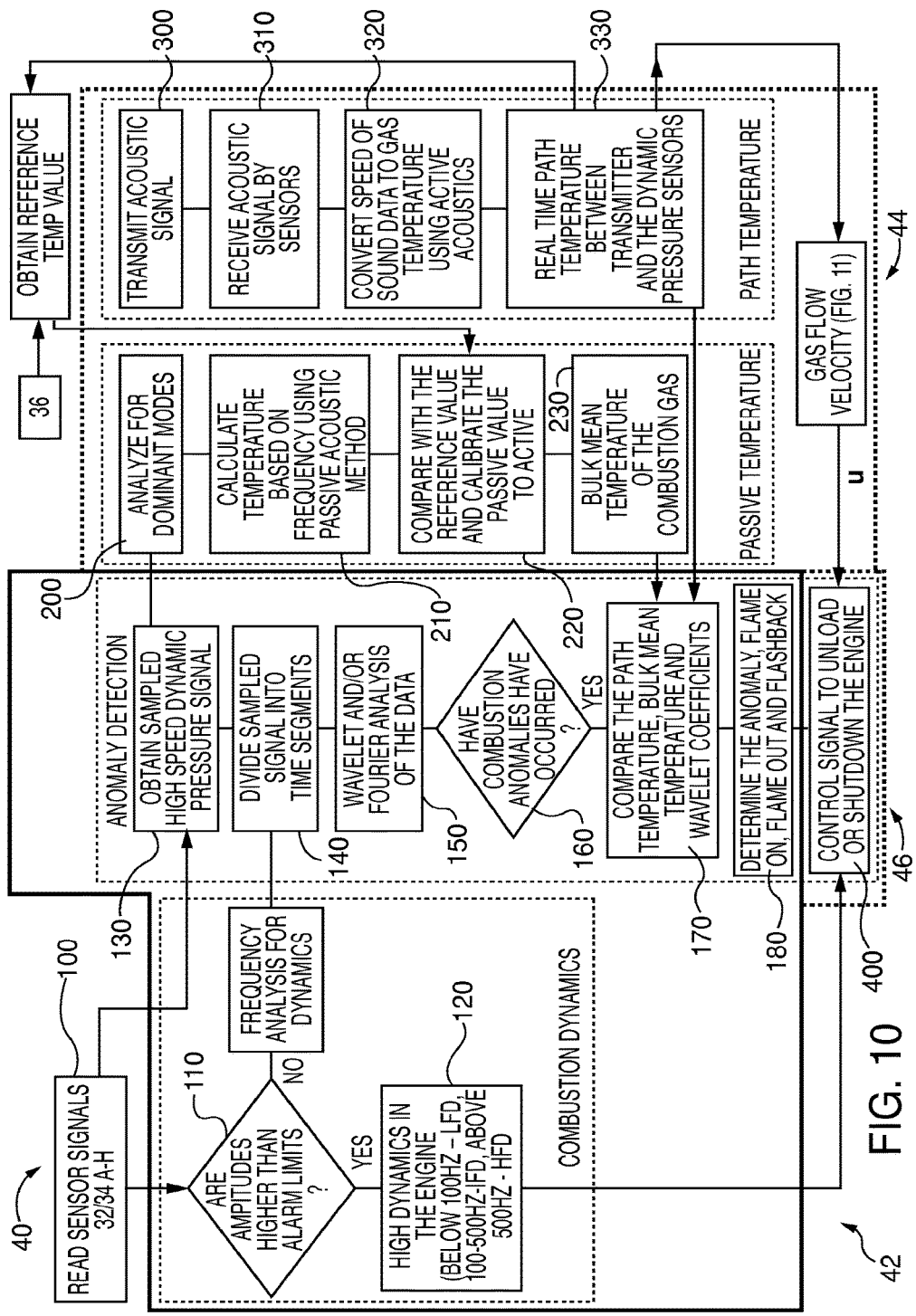
FIG. 10 is a flow chart illustrating implementation of an embodiment of the methods for measuring gas flow velocity and temperature active measurement in a gas turbine combustor, in accordance with embodiments of the invention.
Figure 11:
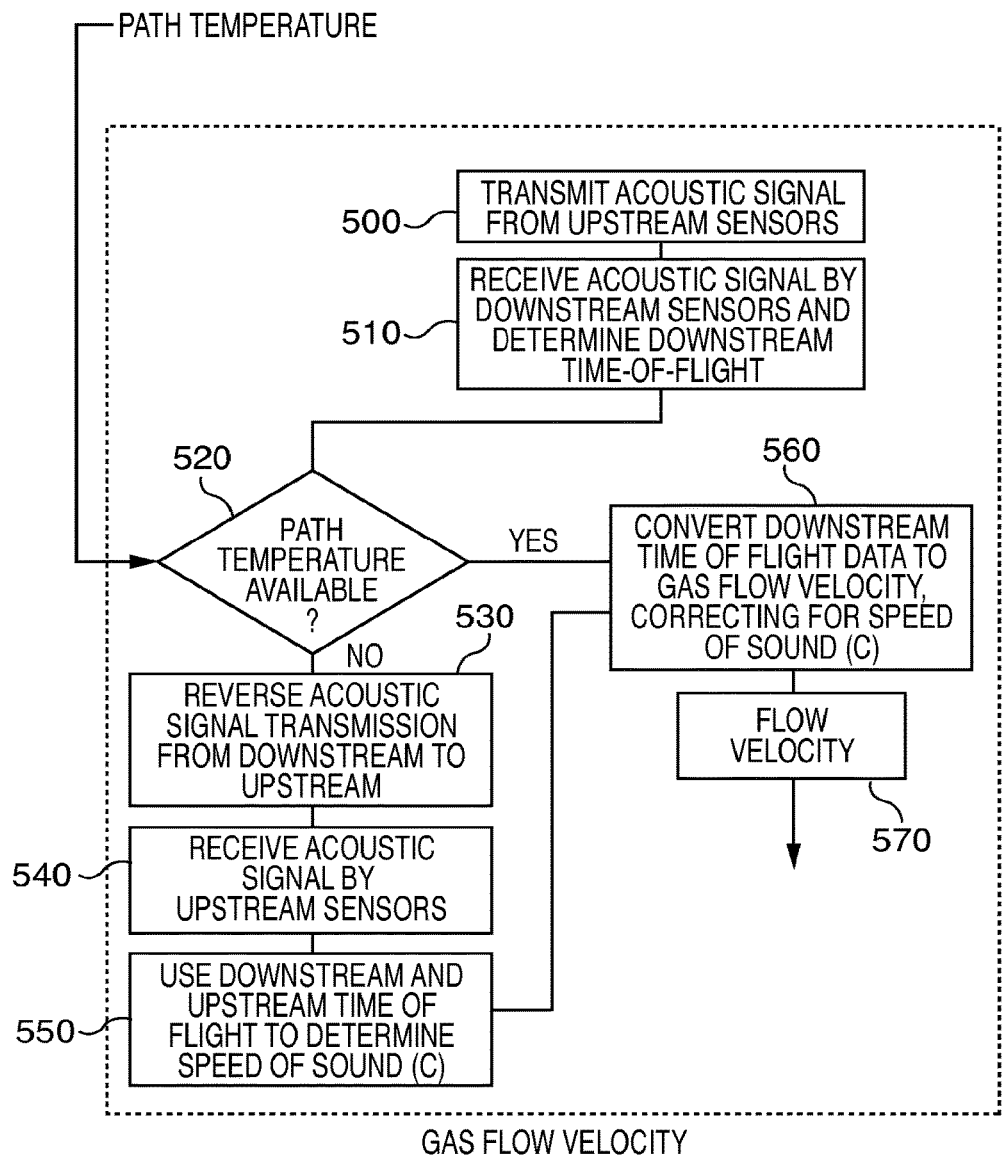
FIG. 11 is a flow chart illustrating implementation of an embodiment of the method for measuring active gas flow velocity, in accordance with embodiments of the invention.

The concepts of acoustic temperature and velocity measurements are both based on creating a sonic wave, listening to it across the gas stream and finding an average speed of sound across a given path, which is then descriptive for the gas velocity or velocity/temperature. FIGS. 10 and 11 are flow charts illustrating graphically exemplary operation of a monitoring and control system 29 embodiment of the invention that actively monitors and measures both gas flow velocity and temperature using acoustic measurement methodologies. The thick solid and dotted line operational blocks relate to previously described combustion dynamics analysis 42 (solid block), temperature monitoring and determination 44 and gas turbine control 46 functions (including by way of example IGT control functions) that are performed within the controller 40. In step 100 sensor signals generated by the sensor components within the transceiver/transducers 32A-H, 34 A-H are read. In step 110 amplitudes of one or more of the sensor signals are compared to previously established alarm limits. For example in IGT applications the step 120 low frequency dynamics (LFD) below 100 Hz are of importance because of potential resonance influence at the 50 Hz or 60 Hz engine rotational speed. Other frequency bands of interest are intermediate frequency dynamics (IFD) between approximately 100-500 Hz and high frequency dynamics (HFD) above 500 Hz. If an alarm limit is exceeded the controller 40 sends a control command, for example to the fuel injection system 28, to unload or shut down the engine 10 in step 400.

If an alarm limit is not exceeded in step 110, then frequency analysis for dynamics is performed in anomaly detection portion of the combustion dynamics analysis sub system. An exemplary description of how to perform anomaly detection is in U.S. Pat. No. 7,853,433 that is incorporated herein by reference. The sampled high speed dynamic pressure signal is obtained from the sensors in step 130 and time divided into segments in step 140. In step 150 the time-frequency divided sample segments are analyzed using the wavelet analysis technique described in U.S. Pat. No. 7,853,433. Alternatively, a known Fourier spectral analysis that converts the time segments into frequency space, analyzes dominant frequencies by identifying the peak frequencies and their respective amplitudes, and identifies amplitudes exceeding defined thresholds. If it is determined that a combustion anomaly or anomalies have occurred in step 160 the combustor temperature as determined in the temperature monitoring and determination subsystem 44 is compared with the anomaly information obtained by the Fourier or wavelet analysis techniques, or both. In step 180 the anomaly classification as a flame on, flame out or flashback is made in conjunction with the passive or path temperature information obtained from the temperature monitoring and determination subsystem 44. For example in a gas turbine flameout the combustor temperature drops off dramatically. Conversely in a flashback scenario the combustor temperature rises dramatically upstream within the combustor 14. When the anomaly determination is made in step 180 appropriate control signals to unload or shut down the engine are made in the engine control system 46.

The temperature monitoring and determination subsystem 44 may comprise passive temperature determination utilizing the passive acoustic method described in United States Patent Application "Temperature Measurement in a Gas Turbine Engine Combustor, filed on Mar. 14, 2013, Ser. No. 13/804,132, incorporated by reference herein, and/or real time actual path temperature determination within the combustor 14. Real time actual path temperature is determined by adaptation of the 2-D planar acoustic pyrometry technique for gas turbine exhaust system temperature determination described in United States Patent Publication No. US2012/0150413 (also incorporated by reference herein) or by a 3-D technique that determines one or more path temperatures between the sensor arrays 32/34 of FIG. 5, that is further described in greater detail herein.

In the passive temperature determination method, sampled high speed dynamic pressure signals from the transceiver/transducers 32/34, such as obtained in step 130 are analyzed for dominant modes in step 200. Combustor temperature is calculated based on frequency using the passive acoustic method in step 210. The passive value is calibrated with a reference temperature value in step 220 in order to obtain an active temperature value within the combustor 14. The calibrated passive temperature value determined in step 220 is utilized in step 230 to determine the bulk mean temperature of the combustion gas in step 230. The reference temperature value used in step 220 may be obtained from one or more thermocouples 36 in the combustor or thermocouples located in the exhaust system 18 (not shown). The reference temperature value may be an actual path temperature measured in the exhaust system 18, as described in United States Patent Publication No. US2012/0150413 or a real time path temperature measured in the combustor 14 that is determined in steps 300-330.

The 2-D real time path temperature is measured by transmitting one or more acoustic signals in an acoustic transceiver/transducer 32, 34 or other discrete transmitter, such as in the 2-D planar pattern shown for the (n=8+ transceiver/transducers 32A-H in FIG. 9. For example, transceiver/transducer 32A transmits a signal that is received by the remaining (n−1) transceiver/transducers 32B-H and the time-of-flight for each line-of-sight path is determined. However, at least one, preferably two or more sensor elements in the remaining transceiver/transducers 32B-H receive the acoustic signal(s) in step 310. Preferably in practice several transceiver/transducers (transmit and receive acoustic signals) circling one plane such that the paths between all transceivers form a grid with desired coarseness which results in the spatial resolution of the temperature measurement. For example, for a cylindrical combustor the transceivers could be equally spaced around the periphery as shown in FIGS. 3 and 9. These could be either fired sequentially (one at a time) or simultaneously with disjoint sound patterns that can be readily differentiated. For sequential firing one transceiver is creating sounds while all remaining transceivers record it to estimate the travel time for the respective paths. Each of these line-of-sight paths represents an average temperature along that path. The average temperatures over different paths are combined to a two-dimensional map shown in FIG. 9, using a known computer tomography technique.

The 2-D time-of-flight sound data are converted to gas temperature using active acoustics in step 320, such as by utilization of the methods described in the aforementioned United States Patent Publication No. US2012/0150413 that is incorporated by reference herein. The real time path temperature that is determined in step 330 is the localized active temperature value along the line-of-sight transmission path. A plurality of active temperature values measured along different acoustic paths by performing the steps 300-330 can be utilized to determine the combustor 14 bulk temperatures, alone or in parallel with the dominant frequency passive acoustic method of steps 200-230. While a single path active temperature measurement between a single transmitter 30 and acoustic sensor 32 provides useful control information, arraying a plurality of transceiver/transducers 32, 34 selectively in any axial, circumferential acid/or radial pattern or combinations thereof within a combustor 14 (see, e.g., FIG. 2, 3, 5, or 9) or in a series of combustors 14 facilitates active real time two- or three-dimensional combustion temperature monitoring within the gas turbine engine 10.

The 2-D or 3-D real time path temperature determined in steps 300-330 can be utilized as an input for other monitoring and control functions, with or without one or more of the combustion dynamics analysis 42, passive temperature monitoring and determination 44 and control 46 functions described in the exemplary integrated monitoring and control system 29 described herein. For example combustor turbine inlet temperature (FIT) can be actively monitored in real time and used as a control parameter for the combustion process. The combustion active path temperature determined in steps 300-330 can be utilized to control the fuel/air mixture in the combustor 14 via the fuel injection system 28. The real time path active temperature can be utilized as an input for active actual gas flow velocity measurement in an industrial gas turbine combustor or in other types of gas flow environments.

Embodiments of the present invention measure 3-D gas flow velocity and/or gas flow temperature by correlation with sonic time-of-flight along a line-of-sight sonic pathway between axially spaced, transversely oriented sonic transmitter and sensor (or transceiver/transducers incorporating the sensors and transmitters), so that the line-of-sight along the pathway is oriented transverse, as opposed to parallel to the gas flow path. In order to determine gas flow absolute velocity, the time-of-flight data are corrected or compensated for thermodynamic influences on gas temperature, gas constant and speed of sound. As noted above gas temperature along a line of sight can be determined using the real time active path temperature or temperature independently obtained from another measurement device (e.g., thermocouple 36). Alternatively localized speed of sound c can be determined by measuring bi-directional time-of-flight (i.e., forward/downstream transmission and reverse/upstream transmission). The aforementioned thermodynamic influences are governed by the known equation:

$$c(x,y,z) = (\gamma \cdot R \cdot T)^{1/2}$$

Where:
$c(x,y,z)$ is the isentropic speed of sound;
$\gamma$ is specific heat ratio;
R is the gas constant; and
T is the gas temperature.
Therefore, once the speed of sound along a path is known, the average path temperature and absolute velocity can be determined utilizing embodiments of the invention further described herein.

For accurate absolute velocity or temperature measurement, two planes of transceiver/transducers 32, 34 are oriented in axially spaced, opposed relationship within the gas flow, as shown in FIG. 5. The two transceiver/transducer planes 32, 34 are preferably apart by approximately the same order of magnitude as the diameter (circular) or width (square or rectangular) of the monitored gas flow geometry. That is, the axial distance between the two planes should be determined according to the geometry and scale of the interrogated environment as well as the anticipated or possible ranges of gas flow gas constant, temperature and velocity.

For gas flow velocity estimation, the gas flow is measured axially and transverse to the flow direction. For example, when transceiver/transducer 32A in plane $Z_I$ fires or transmits a signal, all transceiver/transducers 34B-H in plane $Z_{II}$ that are not parallel-aligned with the signal firing sensor will be listening, thereby creating several paths across the gas flow (n−1 paths for n sensors). The signal transmitting/receiving firing process continues sequentially with the second transceiver/transducer 32B on plane $Z_I$ firing to the remaining (n−1) transceiver/transducers 34A and 34C-H, which receive that transmitted signal. The transmitted signal firing will continue on with the consecutive transceivers firing and creating n−1 paths for each firing. In the embodiment of FIG. 5, having 8 transceivers/transducers in each of the two axially spaced arrays there are a total of 64 paths in three dimensions. In addition, to alleviate the directional ambiguity of the velocity (to identify reverse flows and perhaps turbulence fluctuations in reverse direction) the same process will be repeated with transducer/transceivers 34 in plane $Z_{II}$ firing and transceiver/transducers in plane $Z_I$ receiving the reverse direction transmitted acoustic signal, assuming that the gas flow temperature is already known.

Figure 8:
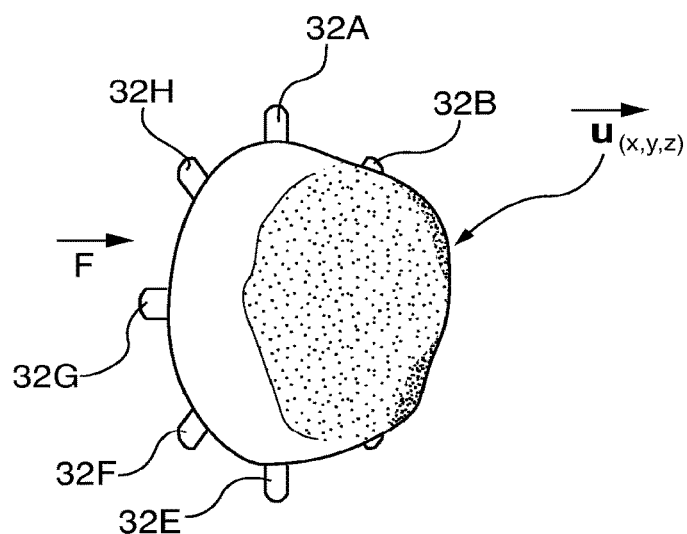
FIG. 8 is a composite gas flow velocity profile of the respective velocities measured by the gas flow velocity monitoring system, in accordance with embodiments of the invention.

Instead of transmitting/firing acoustic signals sequentially from each transceiver/transducer, a sound pattern with a slightly different acoustic signature can be transmitted from each respective transceiver/transducer 32A-H, 34A-H simultaneously, which shortens measurement time Referring to steps 500 and 510 of the gas flow velocity measurement method flow chart of FIG. 11, once all transceiver/transducers in planes $Z_I$ and $Z_{II}$ have fired and the transmitted acoustic signals have been received by the opposing plane of transversely aligned transceivers/transducers, the process preferably repeats continually in real time while a 3-D velocity map u is constructed from the spatially distributed line-of-sight acoustic paths, using known 3-D tomographic mapping techniques, such as those utilized in medical or industrial computed tomography systems. The velocity information is extracted and mapped, as shown in FIG. 8. Similarly, a 3-D temperature map T can be constructed utilizing the time of flight data, as will be described in greater detail herein.

After all of the transceiver/transducers 32, 34 in a planar array have fired acoustic signals the respective line-of-sight flow path time-of-flight data are used to derive absolute velocity in the gas flow path in step 560, once corrected for the thermodynamic effects of temperature, gas constant and the speed of sound, as described in greater detail below. Flow velocity measurement accuracy potentially decreases as flow velocity approaches the speed of sound, assuming constant gas temperature in the velocity measurements. Flow velocity below a Mach number of approximately 0.5 is not believed to impact velocity measurement significantly. Therefore it is preferable, but not required, that measured flow velocities should be smaller than half of the local speed of sound that is measured. This method can accurately measure high temperature gas flows, including turbine engine gas flows, despite relatively high absolute velocities, because the local speed of sound increases with temperature.

Figure 6:
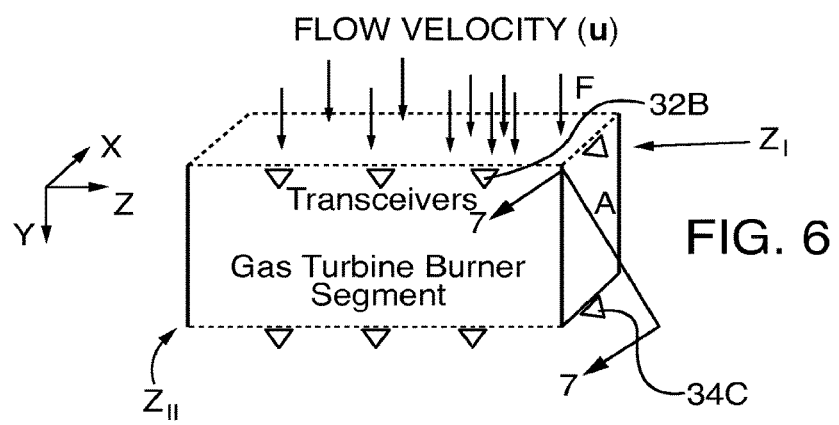
FIG. 6 is an exemplary schematic representation of gas flow velocity in the turbine combustor of FIG. 5 in the line-of-sight between acoustic sensors 32B and 34C.
Figure 7:
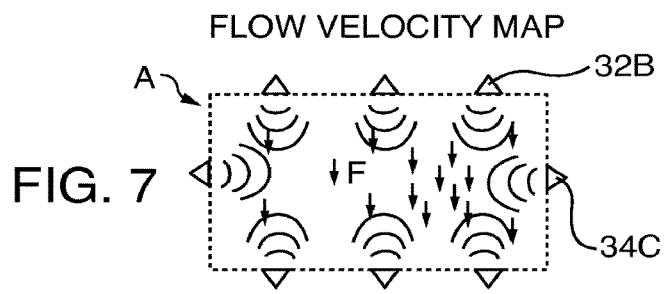
FIG. 7. is a cross-sectional slice A of the gas flow velocity of FIG. 6 taken along 7-7 thereof, which corresponds to the line-of-sight between acoustic sensors 32B and 34C.

Once acoustic time-of-flight data are available, they are used by the monitoring and control system 29 or other remote monitoring system to determine velocity along their respective acoustic paths in accordance with the remainder of the steps of FIG. 11. Referring to FIGS. 6 and 7, information sound propagation is linearly affected by the gas flow. Relative gas flow velocity for a given temperature, gas constant and speed of sound is determined by the known equation:

$$t_{BC} = \int_B^C \frac{1}{c(x, y, z) + \vec{p}_{BC} \cdot \vec{u}(x, y, z)} ds$$

Where:
$t_{BC}$ is the time-of-flight from the first transmitter B to the first sensor C;
c is the speed of sound in the gas flow for the temperature and gas constant;
$\vec{p}_{BC}$ is the unit vector along the first line of sound path A between B and C; and
$\vec{u}(x,y,z)$ is velocity vector in the gas flow.

The exemplary planar slice along the line-of-sound path A shows a simplified flow pattern. Referring again to the flow chart of FIG. 11, the relative gas flow velocity is corrected for thermodynamic temperature, gas flow and speed of sound influences, in order to derive absolute velocity in step 560. If the path temperature is available (step 520) its influence on the speed of sound can be corrected by known tomography methods, in order to derive the gas flow absolute velocity along the line-of-sound path. If the path temperature is not available, times-of-flight for forward (steps 500, 510) and reverse (steps 530, 540) acoustic signal transmission are acquired and used to extract the speed of sound without effect of the gas velocity in accordance with the following equations. The reverse time-of-flight from transducer/transceiver C to transducer/transceiver B is determined by the following equation, similar to that for the forward or downstream direction set forth above:

$$t_{CB} = \int_C^B \frac{1}{c(x,y,z) + \vec{p}_{BC} \cdot \vec{u}(x,y,z)} ds$$

The forward and reverse times-of-flight are added in accordance with the following equation:

$$t_{BC} + t_{CB} = \int_B^C \frac{2 \cdot c(x,y,z)}{c(x,y,z)^2 + \vec{p}_{BC} \cdot \vec{u}(x,y,z)^2} ds$$

Given that the square of the speed of sound c is much greater than the square of the gas flow velocity u, the equation is reduced to:

$$t_{BC} + t_{CB} \approx \int_B^C \frac{2}{c(x,y,z)} ds$$

where:
$t_{BC}$ is the time of flight from the first transceiver/transducer B to the second transceiver/transducer C;
$t_{CB}$ is the time of flight from the second transceiver/transducer C to the first transceiver/transducer B;
c is the speed of sound in the gas flow for the temperature and gas constant;
$\vec{p}_{BC}$ is the unit vector along the first line of sound path; and
$\vec{u}(x,y,z)$ is the velocity vector in the gas flow.

The speed of sound c determined in step 550 of FIG. 11 is then used to correct the downstream time-of-flight data for that speed of sound in step 560. The corrected downstream time-of-flight data are used to determine gas flow absolute velocity in step 570. Where the path temperature T along a line-of-flight is not known, the same speed of sound c determined in step 550 is utilized in some embodiments of the invention to determine T, using the previously described isentropic speed of sound relationship $c(x,y,z)=(\gamma \cdot R \cdot T)^{1/2}$, as γ, R and c(x,y,z) are now known. In a similar manner to the path velocity determinations previously described, once all the path temperatures T are known from each receiver/transmitter unit back and forth, there will be 64 (assuming exemplary 8-sensor case) iso-temperature lines in 3-dimensions. Then using known 3-D tomographic mapping techniques, the 3-dimensional temperature distribution is mapped.

Advantageously the active acoustic temperature and velocity measurements are performed simultaneously in real time, thus mapping both gas flow temperature (3-D or alternatively the 2-D mapping of FIG. 9) and 3-D gas flow velocity (FIG. 8). An exemplary acoustic signal transmission and reception timing sequence to perform simultaneous velocity and temperature measurement is to emit an acoustic signal with a transceiver/transducer on a first array plane (e.g., 32A at $Z_I$). The corresponding transversely oriented transceivers/transducers on an axially spaced opposed second plane 34B-H at $Z_{II}$) receive the signal for velocity processing and/or temperature processing, if 3-D temperature measurement is utilized. If only 2-D temperature measurement is utilized the remainders of the transceiver/transducers on the first array plane (e.g., 32B-H at ZI) receive the signal for temperature processing. As previously noted the transmission and receiving process also can be accelerated by utilizing unique signal transmission patterns for each transceiver/transducer. There are tradeoffs associated with use of 2-D or 3-D temperature measurement. Where 3-D temperature measurement techniques are utilized, accuracy of both temperature and velocity map may not be the most desired in case of gas velocities of Mach 0.3 or above as the approximation shown in the equation $$t_{BC} + t_{CB} \approx \int_B^C \frac{2}{c(x,y,z)} ds$$

may be less accurate in those velocities ranges, because there are no independently determined temperature reference values. However, independent temperature T reference values may be determined, using a pair of axially separated 2-D acoustic signal sets and two individual acoustic temperature maps determined with the respective 2-D time-of-flight signal sets. The 2-D temperature maps are in turn interpolated to create a volumetric temperature map. This volumetric map will be used to provide the temperature values T utilized in the isentropic speed of sound equation, along with the known gas constant R and specific heat ratio to extract speeds of sound c. The speed of sound is then used to extract the velocity vectors u(x,y,z). Once the velocity vectors are extracted the velocity components can be mapped, eliminating the limitation of below Mach 0.3 gas velocities inherent in the previously descried 3-D velocity and temperature mapping methods.

Combustor active gas flow velocity or velocity/temperature monitoring utilizing the system and method embodiments described herein with arrays of commonly utilized acoustic sensors is believed to provide faster velocity and temperature change response than known velocity and temperature monitoring systems. In accordance with embodiments of the invention one array of commonly utilized, reliable acoustic transceiver/transducer sensor-transmitters or arrays of separate discrete acoustic sensors and transmitter pairs can be placed in a combustion flow path under field conditions and monitored to provide active, real time simultaneous velocity and temperature data and anomaly detection that are all useful for monitoring and control of combustion power generation equipment, such as industrial gas turbines.

Mapping Parameter Distributions

A parameter map in a two-dimensional or three-dimensional space has numerous uses in the design, diagnosis and control of machinery. For example, a temperature or velocity map of a region of the gas path is useful in diagnosing and accurately measuring the performance of a gas turbine engine. The map may, for example, be a temperature map in the vicinity of the combustor flame or may be a turbine inlet temperature map in the region exiting the combustor. Simple temperature maps are presently created using thermocouple temperature rakes and temperature probes mounted on the first row vane to obtain measurements from which a crude linear temperature profile may be fit. Those short-term, intrusive methodologies provide crude profiles based on sensor locations but do not provide a spatially resolved map of temperatures in real time that one could utilize to control a gas turbine or to understand temperature distribution during a new engine design validation process.

Figure 12:
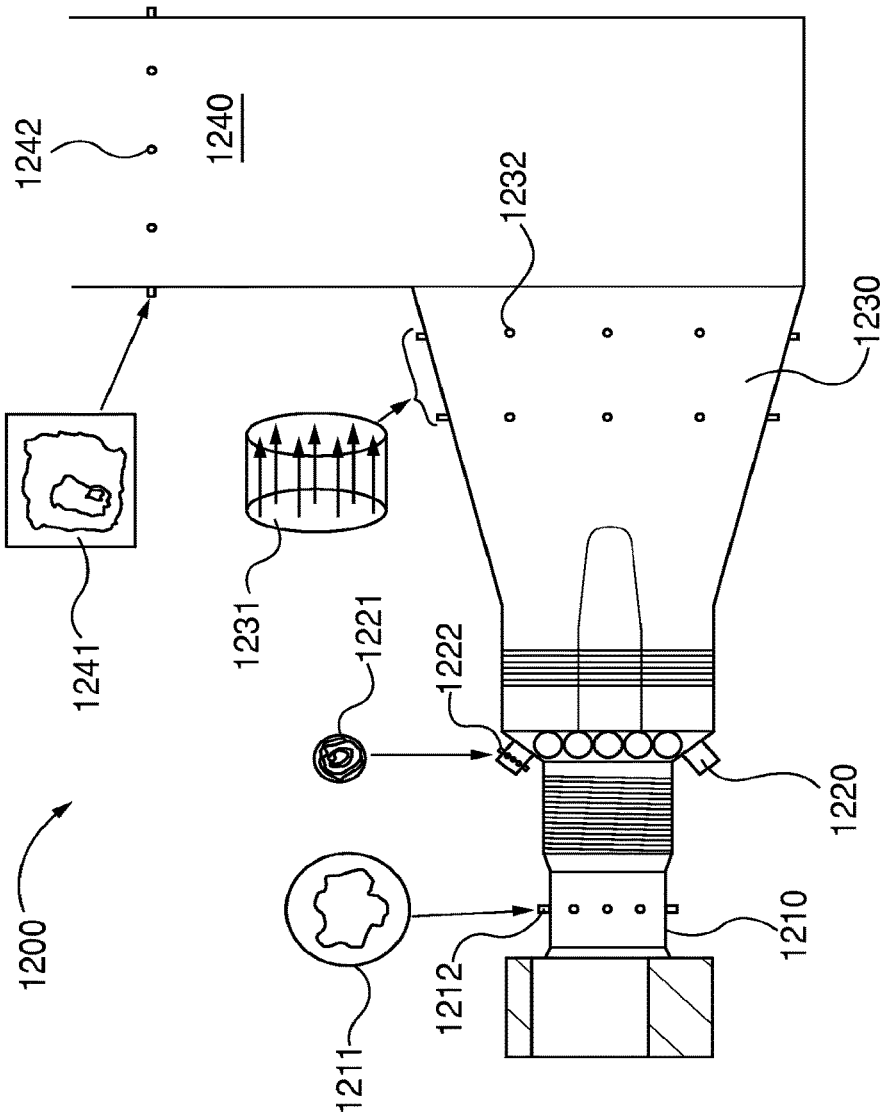
FIG. 12 is a schematic illustration of a gas turbine engine showing sensor installations in several alternative regions, in accordance with embodiments of the invention.

Presently described are techniques for using acoustic or other signals that are transmitted and received in a region of a gas turbine engine. Many flow regions of a gas turbine engine may be of interest in the use of the presently described techniques, and several exemplary regions are depicted in the schematic diagram of the gas turbine engine 1200 shown in FIG. 12. An inlet temperature map 1211 of a gas turbine inlet 1210 may be created using the described techniques and using acoustic sensors 1212 arranged circumferentially around a planar region of the inlet. A combustor temperature map 1221 may be created to show temperature distributions in regions of the combustors 1220. Depending on the area of interest, the sensors 1222 may be arranged around a plane through a primary combustor flame zone or a turbine inlet (combustor exit). A three-dimensional velocity map 1231 of gas flow through a turbine diffuser 1230 may be constructed using information from sensors 1232 arranged circumferentially around multiple planar regions in the diffuser. An exhaust temperature map 1241 may be created using sensors 1242 to show temperature distribution in a two-dimensional region of the turbine exhaust 1240. One skilled in the art will recognize that the described techniques may be implemented with other sensor arrangements and other gas turbine engine regions to yield additional useful parameter maps.

An advanced methodology of tomographic principles is utilized to extract a spatially resolved map in real time using a few dozen individual paths of the signals. As described above, the sensors may be acoustic sensors and speed of sound information on each path is processed to estimate the average temperature over that path length. At each time interval, representations of each of the paths containing average temperature information are tomographically mapped into the spatial distribution of the temperatures at the measurement time and then updated for subsequent measurement times. Information from the resulting temperature map may be used in the engine control algorithm or to maintain safety of engine operation and low emission levels.

Figure 13:
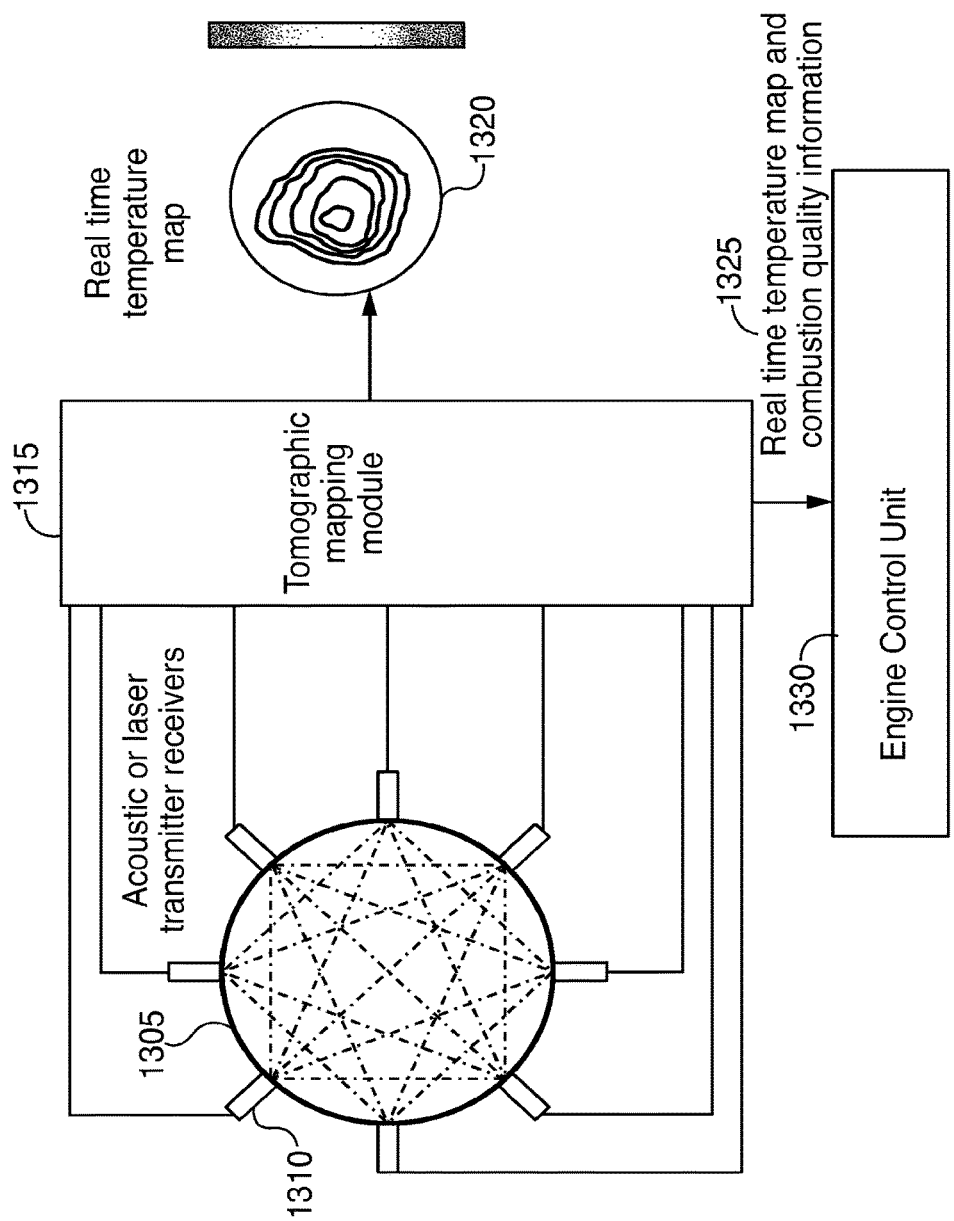
FIG. 13 is a schematic illustration of a system for mapping flow parameters in a gas turbine engine region, in accordance with embodiments of the invention.

In embodiments as discussed above and as shown in FIG. 13, the transmitters and sensors 1310 are circumferentially distributed around a cross section of the hot gas path of one or more turbine regions 1305. The sensors and receivers may, in some embodiments, be acoustic transceivers (sender/receiver combinations) arranged in a plane through the combustor where those transceivers will send and capture acoustic signals in real-time. While the disclosure discusses the sensors and receivers with reference to acoustic sensing techniques, one skilled in the art will understand that the sensors and receivers may alternatively utilize laser-based tunable diode laser absorption spectroscopy or another measurement technology to determine an average temperature along a line path in the combustor. In the case of acoustic transceivers, the transmitted signals are used to determine an average speed of sound, which is used to estimate an average temperature.

In the case of laser based tunable diode laser absorption spectroscopy, several techniques for temperature measurement are possible. Path averaged temperatures may be measured by probing two different absorption lines for the same species while sweeping the laser across the absorption spectrum. Laser absorption by gases across the plane in certain infrared wavelength bands is proportionate to species concentration and temperature and can be solved to provide averaged path temperatures along each line. Alternatively, the Full Width at Half Maximum (FWHM) of the probed absorption line may be related to the Doppler line width of the species. Other laser-based or other temperature measurement techniques may be used without departing from the scope of the disclosure.

In the case of temperature mapping, a tomographic mapping module 1315 converts a plurality of average path temperatures into a temperature map 1320 at each time interval that the temperatures are sampled. The two-dimensional or three dimensional map includes high spatial resolution isotherms and provides more valuable information than separate average path temperature estimates for interpretation of the engine health as well as for inputs to the engine control algorithm. The temperature map 1320, together with derived combustion quality information 1325, is transmitted to an engine control unit 1330 that utilizes that information to control the combustors and/or the gas turbine engine.

While described with reference to the construction of a temperature map from average path temperature estimates, the techniques described herein may be used to construct other two dimensional or three dimensional maps from average values of paths. For example, the estimated average velocities along transmitter receiver paths may be used to construct a two-dimensional or three dimensional map of local velocities using the similar methods.

Described herein are several different techniques for mapping and extracting spatial information about a parameter from a set of path averaged lines in a region. Those techniques include a polynomial approximation method, a basis function method and a grid optimization method. Each of those techniques is described in turn below. While several of the descriptions refer to an exemplary embodiment in which a gas flow temperature is measured, one skilled in the art will recognize that the described techniques are applicable to mapping other parameters where average values along linear paths are available.

Figure 14A:
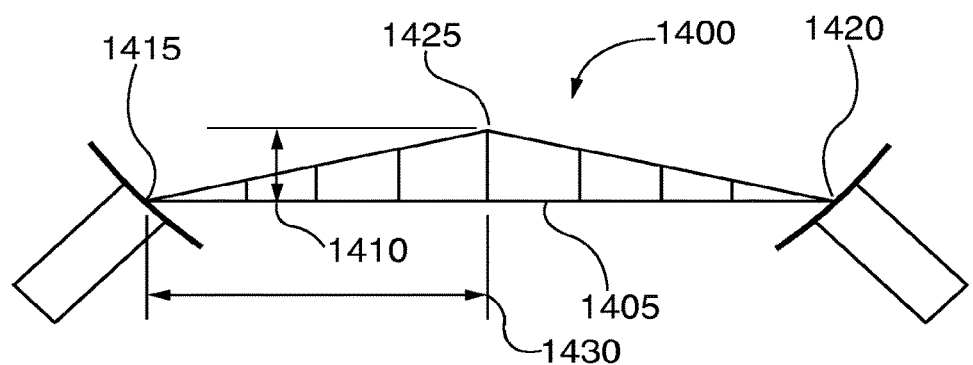
FIG. 14A is a schematic depiction of a bilinear representation of a parameter along a path, in accordance with embodiments of the invention.
Figure 15:
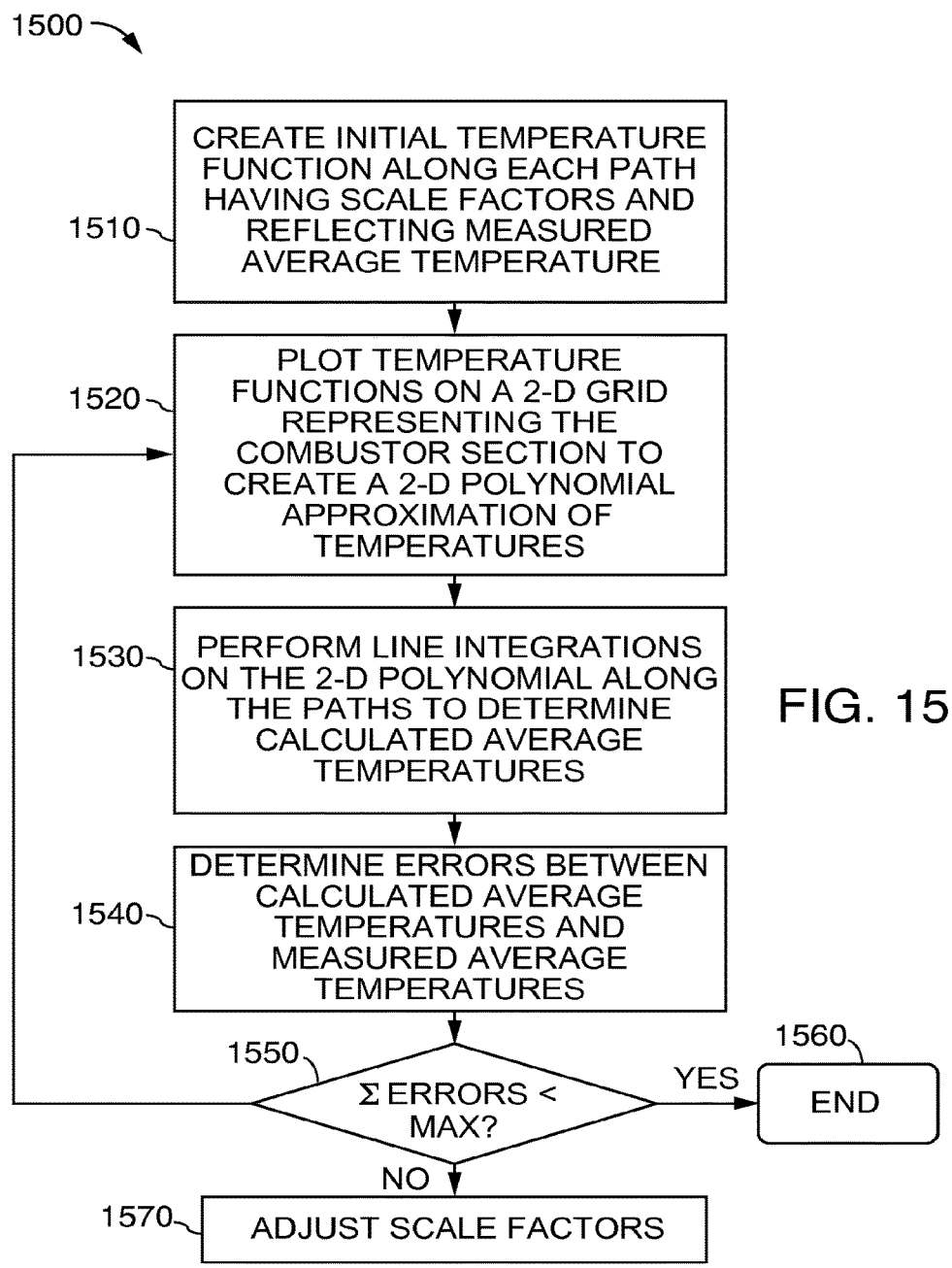
FIG. 15 is a flow chart showing a technique for mapping a parameter based on average path values, according to embodiments of the invention.

Polynomial Approximation Technique:

One way of accomplishing the task of converting a plurality of average path temperatures to a temperature map is to approximate the temperature profiles along each path with a polynomial and then, through an iterative process as shown in the flow chart 1500 of FIG. 15, to adjust the parameters of each polynomial to minimize errors. To do this, each path, such as path 1405 shown in FIG. 14A, is initially assigned, in operation 1510 (FIG. 15), a temperature function that includes scale factors and reflects the estimated average temperature along the path. In the bi-linear profile 1400, temperatures increase linearly from the end points 1415, 1420 (i.e., the transmit and receive points at the chamber walls) to form a peak 1425 yielding a profile similar to the cross section of a tent. The initial maximum temperature is at the peak and the minimum (wall) temperatures are at either end. The distance 1430 from the transmit end point 1415 to the peak 1425 is determined by a midpoint scale parameter. The midpoint scale parameter may be initially set to 50% of the path length by default.

The peak height 1410 defines the initial maximum temperature along the path 1405 at the peak 1425. Initially, a peak height scale factor may be set to the value of two times the average path temperature.

The end points 1415, 1420 may be assumed to be constant and are held at a constant level by the algorithm relative to a wall temperature variable. The wall temperature variable may be selected in several ways. In one example, a fixed value is manually entered. In another example, a percentage of the average path temperature, or the minimum path temperature, is used. In other embodiments, an actual sensor such as a high temperature thermocouple is used to input a wall temperature signal directly into the algorithm.

Bilinear integration is performed from the transmit point 1415 (wall temperature) to the mid-point 1425 (measured path temperature iteratively computed scale factor) and back down to the receive point 1420 (wall temperature).

Figure 14B:
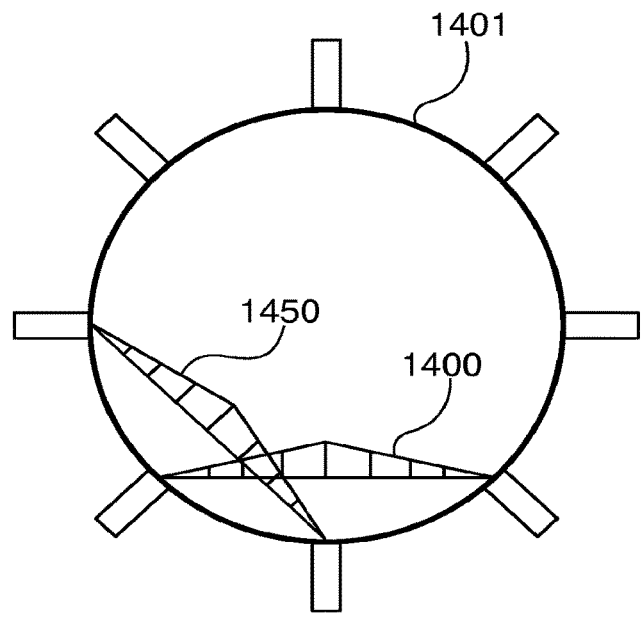
FIG. 14B is a schematic representation of a two-dimensional space with two bilinear representations of path profiles, in accordance with embodiments of the invention.

The estimated path profile 1400 is then plotted, in operation 1520, into a two dimensional grid representing the planar area of the chamber 1401, as shown in FIG. 14B. That process is repeated for each path, such as exemplary second path 1450. When all temperatures have been plotted onto the grid, the grid contains a sparse representation of the temperature map. As a result, there are missing points on the grid in the open areas between paths. In those open areas, a curve smoothing technique such as a Bezier function is used to transform the set of known points into a polynomial approximation of the actual temperature curve at discrete points on the grid. After the grid is smoothed, line integrations are performed along line paths, in operation 1530, and compared to measured data in operation 1540. The result of that comparison is used to adjust the scale factors in block 1570 for the next iteration to minimize the error between measured and estimated temperatures. The iterative process may be repeated according to decision operation 1550 between 3 and 20 times to produce a surface with the least error when compared to the original measured average path temperatures.

The iterations are ended in operation 1560 when the errors are below a preset maximum. While there is no specification for absolute error or accuracy of the generated isothermal map, an average path error value can be calculated to provide a confidence factor for any given map. The average path error will range from 0 to 3-4% for a typical system in normal operation. If the mapping plane and the physical factors have been optimally selected, this can be used for a very accurate spatial map from the path averaged temperature information.

Figure 17:
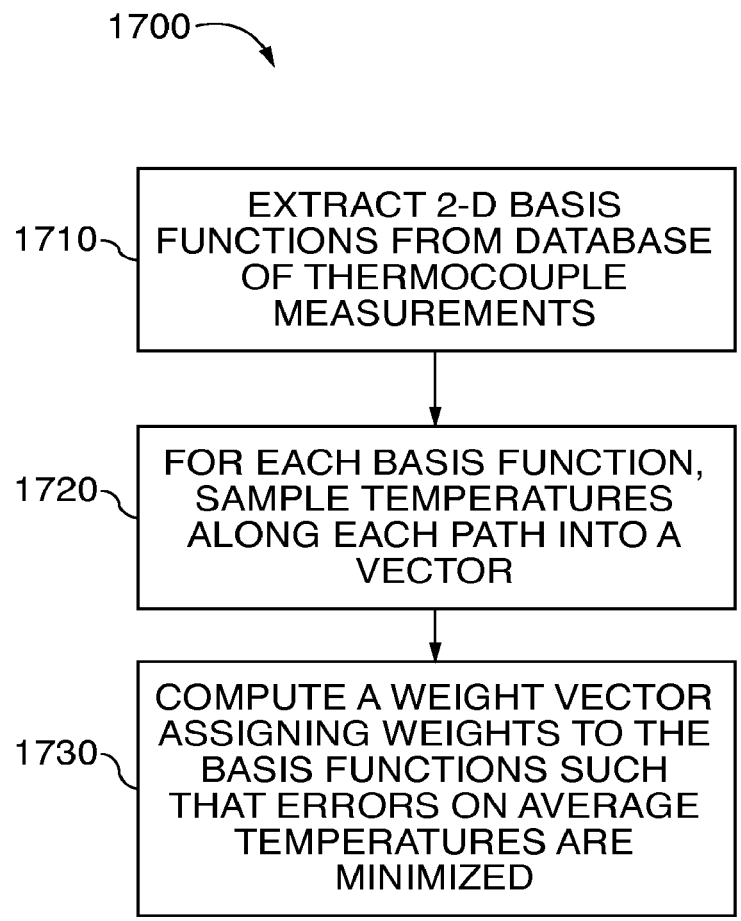
FIG. 17 is a flow chart showing a technique for mapping a parameter based on average path values, according to embodiments of the invention.

Basis Function Technique:

Another technique for converting a plurality of average path temperatures to a two dimensional temperature map is the use of basis functions. In general, every continuous function in a function space may be represented by a linear combination of basis functions. In the presently described technique, portrayed in the flow chart 1700 of FIG. 17, the temperature map is represented by a linear combination of 2-dimensional basis functions derived from thermocouple measurements.

The 2-dimensional basis functions are extracted, as shown in operation 1710, from a large database of thermocouple temperature measurements or other parameter measurements, using a statistical procedure such as principal component analysis (PCA). The boundary conditions are fixed/constant for the 2-dimensional basis functions based on a manually entered fixed value, or on measured wall temperatures. The technique finds weights for the basis functions that minimize error on measured times of flight. In embodiments, the weights are found iteratively.

Figure 16:
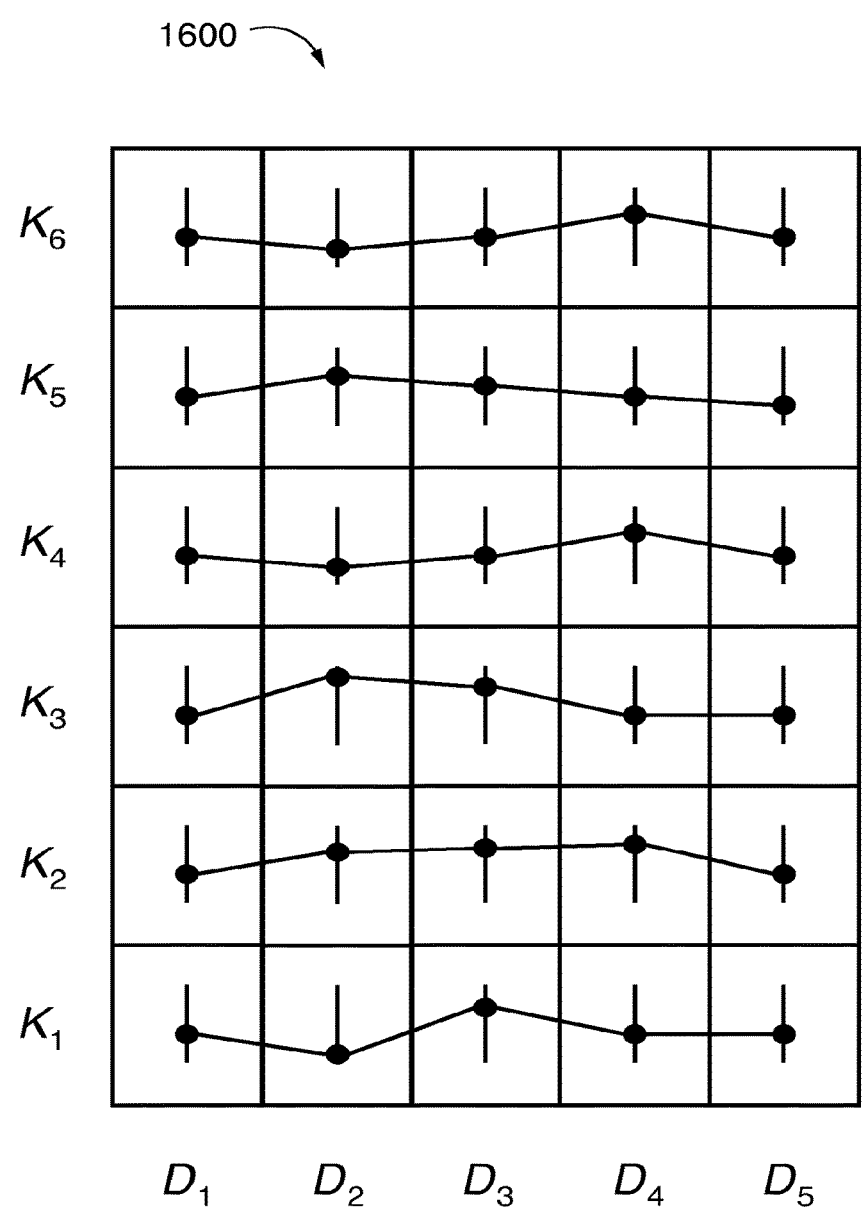
FIG. 16 is a diagram showing parameter profiles for a single path, according to embodiments of the invention.

In one embodiment, there are K two-dimensional basis functions derived from the thermocouple measurements. There are furthermore I acoustic paths i and $t_i$ mean temperatures, one estimated from each time of flight measurement along an acoustic path. For each basis function and path, the path temperatures are sampled (operation 1720) into a vector along a length D of the path. For each path 1, the sampled temperatures are collected in a D×K matrix $X_i$, as illustrated by the matrix 1600 of FIG. 16, which shows, for a single path, six temperature profiles for six basis functions $K_1$-$K_6$, each sampled at five locations $D_1$-$D_5$. For example, for the basis function $K_1$ shown in matrix 1600, five temperature samples are illustrated for five sampled points D1 through D5 along the path. Similar matrices are created for each of the other paths. The goal is to find (operation 1730) the combination of basis functions that best represents the mean temperatures measured by the times of flight. The weighted combination of basis functions is given by the weight vector a which can be found as:

$$\operatorname*{argmin}_{a} \sum_{i=1}^{I} \left\| \frac{1}{D} a^T X_i \underline{1} - t_i \right\|^2.$$

Figure 18:
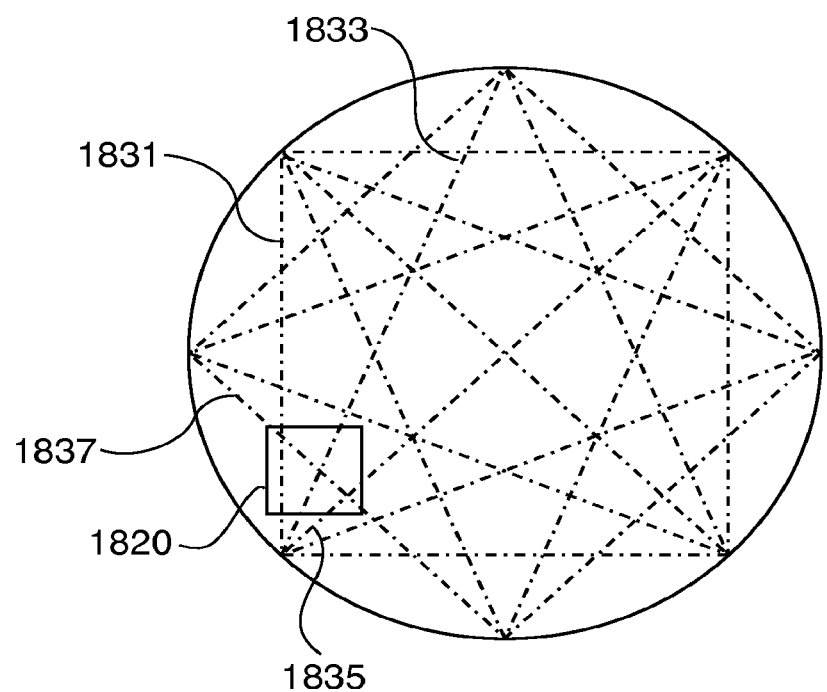
FIG. 18 is a schematic view of a two dimensional space showing measurement paths and a grid segment, according to embodiments of the invention.
Figure 19:
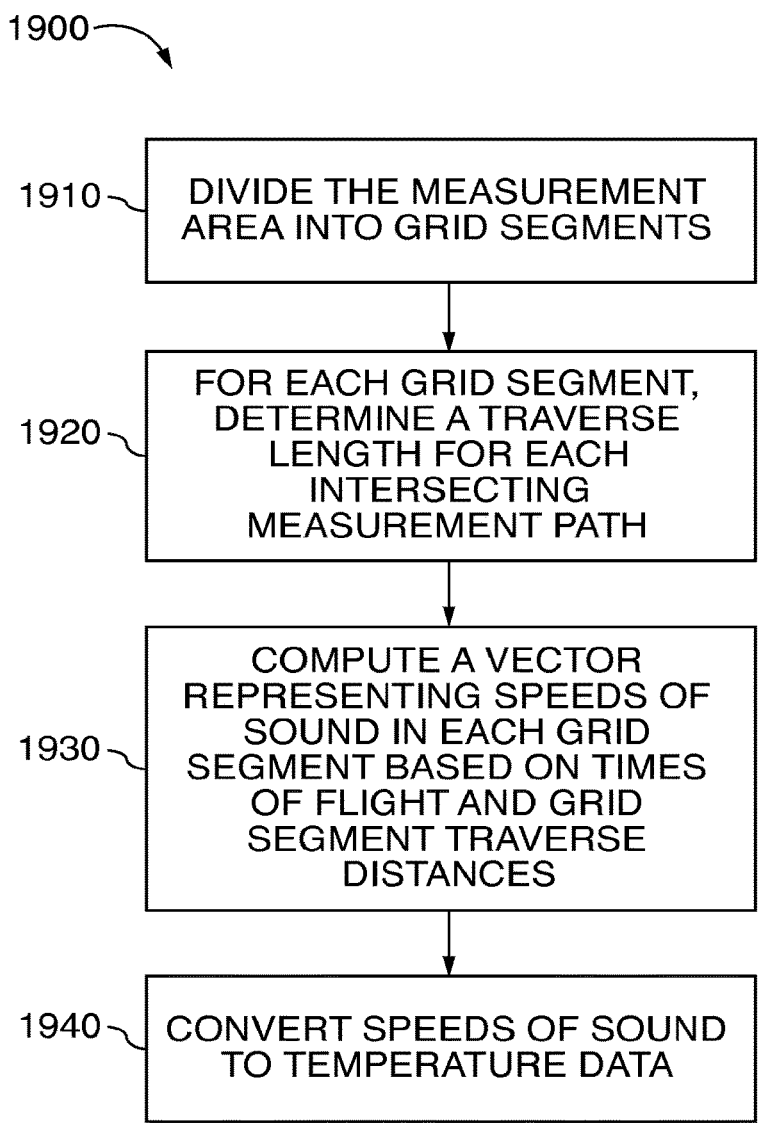
FIG. 19 is a flow chart showing a technique for mapping a parameter based on average path values, according to embodiments of the invention.

Grid Optimization Technique:

In an embodiment utilizing acoustic signals, the estimated average path temperatures may be converted to a two dimensional temperature map using a grid optimization technique shown in the flow chart 1900 of FIG. 19, in which the 2-dimensional map is segmented into multiple grid segments (operation 1910), such as the grid segment 1820 shown in FIG. 18. The goal is to estimate the value (temperature or velocity) in each grid segment. A grid segment is defined as a region bounded by the horizontal and vertical lines of the grid. The speed of the acoustic signal throughout each grid segment is assumed to be uniform.

The distance covered by each acoustic path in traversing each grid segment is initially calculated, at operation 1920. In the example shown in FIG. 18, the distances within the grid segment that are traversed by paths 1831, 1833, 1835 and 1837 are determined. Since the total time of flight for each path and the distance traversed by the path through each grid segment is known, the time taken to travel through each grid segment along a path can be calculated by solving following system of equations:

$$\begin{bmatrix} t_1 \\ t_2 \\ \cdots \\ t_n \end{bmatrix} = \begin{bmatrix} d_{11} & d_{12} & \cdots & d_{1m} \\ d_{21} & d_{22} & \cdots & d_{2m} \\ \cdots & \cdots & \cdots & \cdots \\ d_{n1} & d_{n2} & \cdots & d_{nm} \end{bmatrix} \begin{bmatrix} x_1 \\ x_2 \\ \cdots \\ x_m \end{bmatrix}$$

where n is an index of paths, in is an index of grid segments, t is the time of flight for a given path, x is a coefficient of each grid segment corresponding to a reciprocal of the speed of sound in that grid segment $$\left( \frac{1}{\text{velocity}} \right)$$

and d is the distance traversed by a path n through each grid segment m.

A boundary condition is applied on the grid segment coefficients corresponding to the boundary $$x_w = c$$

where w is a grid segment index corresponding to the wall and c is a constant derived from the wall temperature.

To reduce the search space and limit the solved result to within acceptable ranges, upper and lower bounds for the coefficients are imposed based on the physical reality. For example, the temperature of each grid segment may be restricted to a value greater than room temperature and less than 1000° C.

The number of grids segments to be solved may greatly exceed the number of path equations, making a large number of solutions possible. In that case, additional optimization criteria such as minimizing the difference between speeds of sound in neighboring grid segments are imposed to obtain a smooth map which is also close to reality.

After computing a value for a speed of sound for each grid segment (operation 1930), temperature values are estimated for the grid segments, and a temperature map may be constructed (operation 1940) using those values.

In embodiments, the above techniques may be employed in controlling a gas turbine engine using temperature data. Once the two-dimensional temperature map is computed, it is available in real-time for the computation of information useful in controlling the engine. For example, referring to FIG. 13, the tomographic mapping module 1315 may compute the bulk mean temperature (average temperature of the map), the distribution of temperature in the plane (as a goodness function or as a profile), and a difference of temperature between different baskets if the combustion system is a can or can annular combustion system. That information is then provided to the engine control unit 1330, which is intelligently programmed to control engine parameters for optimum engine performance (safety, performance and emissions).

As previously described, transceiver/transducers 32A-H and 34A-H (see FIG. 5) transmit and receive acoustic signals that define acoustic paths. Time of flight measurements along corresponding acoustic paths are then used to generate a temperature map such as temperature map 1320 shown in FIG. 13. Each acoustic signal is transmitted and received by transceiver/transducers 32A-H and 34E-H through a waveguide associated with a transceiver/transducer.

Figure 20:
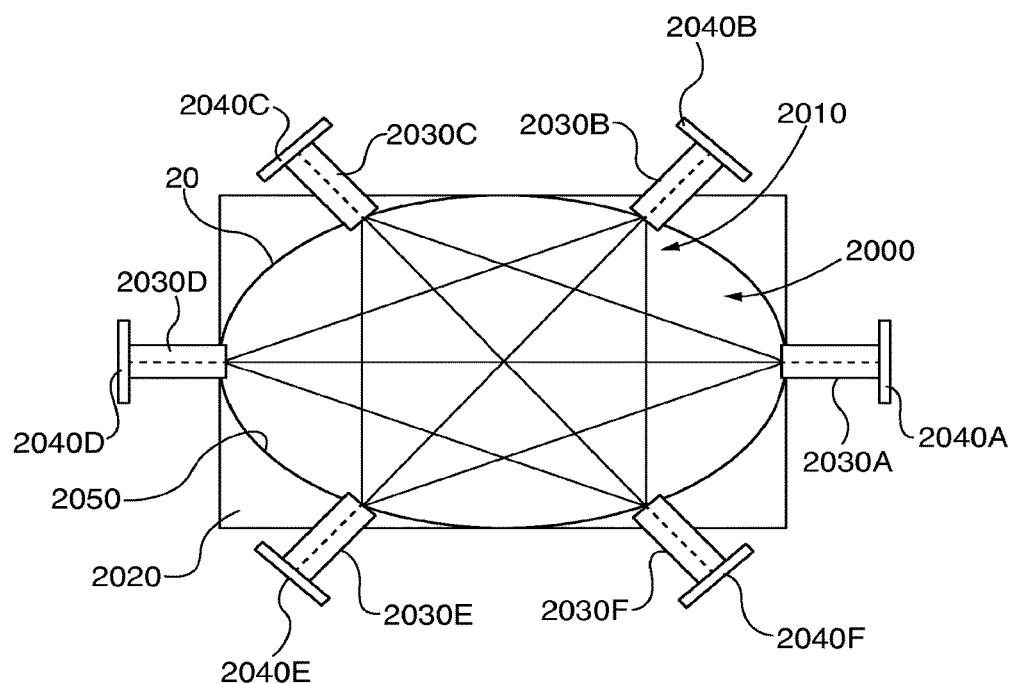
FIG. 20 is an exemplary cross sectional view of a plurality of transceivers each having a waveguide wherein the transceivers each generate an acoustic signal that defines a plurality of acoustic paths travelling through a measurement space of a hot gas flow path.

Referring to FIG. 20, an exemplary cross sectional view is shown of a plurality of acoustic paths 2000 travelling through a measurement space 2010 of a hot gas flow path 2020. For purposes of illustration, the hot gas flow path 2020 is located in a combustor 20 although it is understood that the hot gas flow path 2020 may be located in the turbine diffuser 1230 (see FIG. 12) or an exhaust stack. FIG. 20 depicts a plurality of transceiver/transducers (i.e. transceivers) each having a waveguide, for example transceivers 2040A-2040F having corresponding waveguides 2030A-2030F, respectively. The transceivers 2040A-2040F only measure temperature and gas flow in a volume between the transceivers 2040A-2040F, i.e., the measurement space 2010. However, a temperature at a solid boundary that defines the hot gas flow path 2020 is not measured. Further, a temperature inside the waveguides 2030A-2030F is also not measured. In an embodiment, the solid boundary may be a wall 2050 of the combustor 20.

In order to generate a temperature map, an assumed or selected temperature is used for the wall 2050 and waveguides 2030A-2030F. It has been found by the inventors herein that the wall 2050 and waveguide 2030A-2030F temperatures are important parameters that affect the temperature distribution and temperature values indicated on a temperature map. However, the selected or assumed temperatures that are used are frequently erroneous, resulting in inaccurate temperature maps for a hot gas flow that has not been previously characterized.

Figure 21:
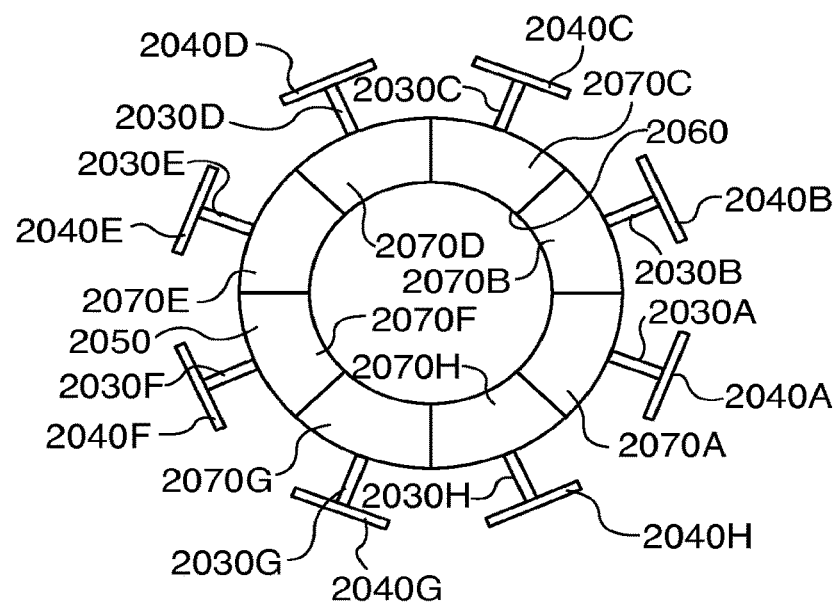
FIG. 21 depicts a boundary portion of a wall that defines the hot gas flow path wherein the wall is divided into a plurality of virtual boundary portions each having an associated transceiver and waveguide.
Figure 24:
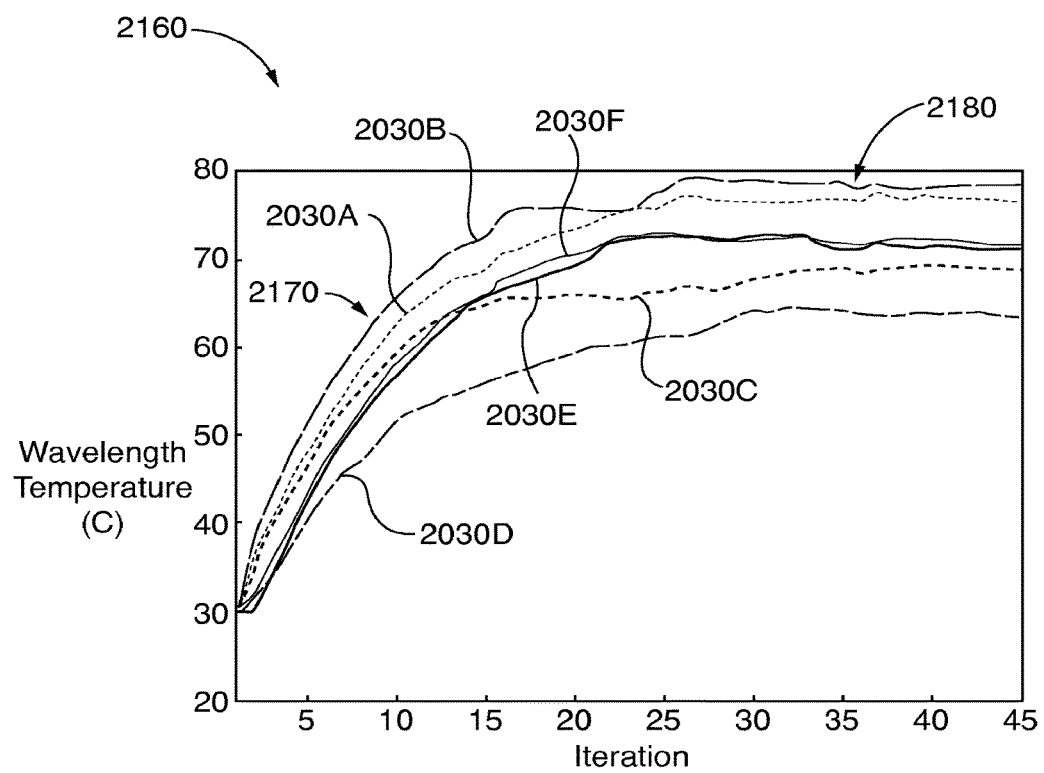
FIG. 24 is a chart depicting an exemplary waveguide temperature plot for each waveguide shown in FIG. 20.

A temperature map includes temperature information near a wall that forms a hot gas flow path. In accordance with embodiments of the invention, waveguide temperatures are calculated based on the temperature near the wall 2050 that is indicated by an initial temperature map. In an embodiment, a linear relationship is established between a wall temperature value and waveguide temperature although it is understood that nonlinear relationships may be used. Referring to FIG. 21, a boundary portion 2060 of the wall 2050 is divided into a plurality of virtual boundary portions 2070A-2070H (eight exemplary boundary portions are shown) thereby thrilling a boundary portion index. Each boundary portion 2070A-2070H is associated with corresponding transceivers 2040A-2040H that include the corresponding waveguides 2030A-2030H, respectively, such that the waveguides 2030A-2030H are located adjacent or relatively close to a corresponding boundary portion 2070A-2070H. The temperature of each waveguide 2030A-2030H is governed by the temperature of its associated boundary portion 2070A-2070H in accordance with Eq. (1):

$$\text{tempAtWaveGuide}(tr\_i)=0.75\times\text{estimated\_wall\_value} \\ (\text{matching\_boundary\_portion})+30K \quad (1)$$

wherein "tr_i" corresponds to a transducer/receiver 2040A-2040H number associated with a boundary portion 2070A-2070H, "tempAtWaveGuide(tr_i)" is a temperature for a waveguide 2030A-2030H corresponding to the transducer number "tr_i" and "K" is the Kelvin temperature scale although it is understood that other temperatures scales may be used. The "estimated_wall_value(matching_boundary_portion)" is an estimated temperature for the boundary portion 2070A-2070H associated with the transducer. This enables calculation of a temperature for each boundary portion 2070A-2070H and thus a corresponding waveguide temperature based on each boundary portion 2070A-2070H, resulting in a plurality of waveguide temperatures as shown in FIG. 24. As will be described, Eq. (1) may be used to calculate an initial waveguide temperature.

Figure 22:
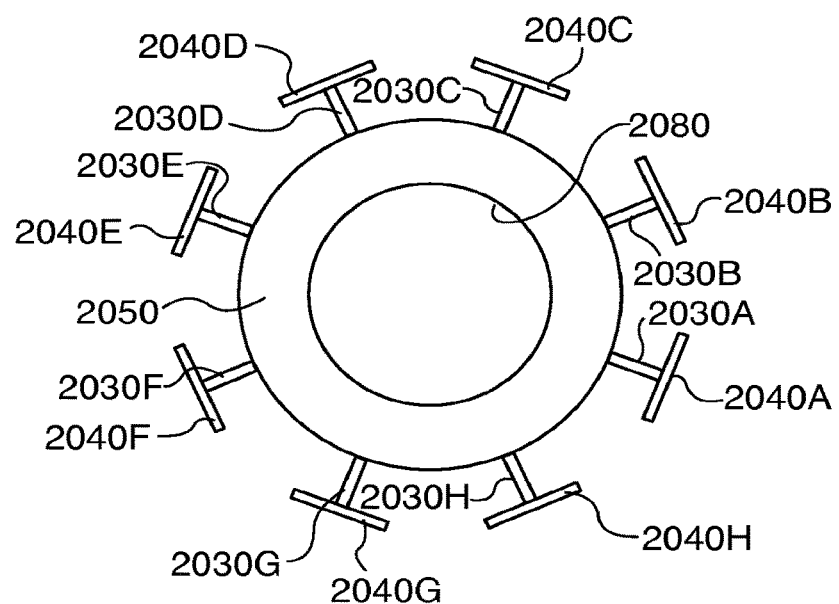
FIG. 22 depicts a boundary portion of the wall that is not divided and that includes transceivers each having a waveguide.

In another embodiment, the wall 2050 is not divided as shown in FIG. 22 and a uniform value for temperature is assumed for each waveguide 2030A-2030H. A temperature is calculated of a complete boundary portion 2080. The temperature of all the waveguides 2030A-2030H is given by Eq. (2):

$$\text{tempAtWaveGuide}=0.75\times\text{mean\_estimated\_} \\ \text{wall\_value}+30K \quad (2)$$

wherein "tempAtWaveGuide" is the temperature of all the waveguides 2030A-2030H, "mean_estimated_wall_value" is the estimated mean temperature for the complete boundary portion 2080 and "K" is the Kelvin temperature scale although it is understood that other temperatures scales may be used.

Referring back to FIG. 20, a total time of flight for an acoustic signal is the sum of the amount of time for the acoustic signal to travel through a waveguide 2030A-2030H and the amount of time for the acoustic signal to travel through the measurement space 2010. The time taken to travel through a waveguide 2030A-2030H is subtracted from the total time of flight and the remaining time is then used to generate a temperature map. Waveguide temperature is an important parameter that affects the time of flight of the acoustic signal. Calculation of an updated waveguide temperature via Eq. (1), for example, causes a corresponding change in the time taken to travel in the measurement space 2010. This in turn causes a remapping of the temperature map. Once a new temperature map is generated, a new wall temperature is obtained from the new temperature map which is then used to calculate a new or estimated waveguide temperature again using Eq. (1). It is understood that Eq. (2) may be used instead of Eq. (1) to update the waveguide temperature.

The waveguide temperature is continually updated, and new temperature maps are generated, if a difference between an estimated waveguide temperature and an initial waveguide temperature, calculated immediately before the estimated waveguide temperature, is greater than a predetermined temperature difference i.e., a temperature differential threshold. If the difference between the estimated waveguide temperature and the initial waveguide temperature is less than or equal to the temperature differential threshold, the temperature of a boundary portion and the temperature of its associated waveguide have converged and the process stops.

Figure 23:
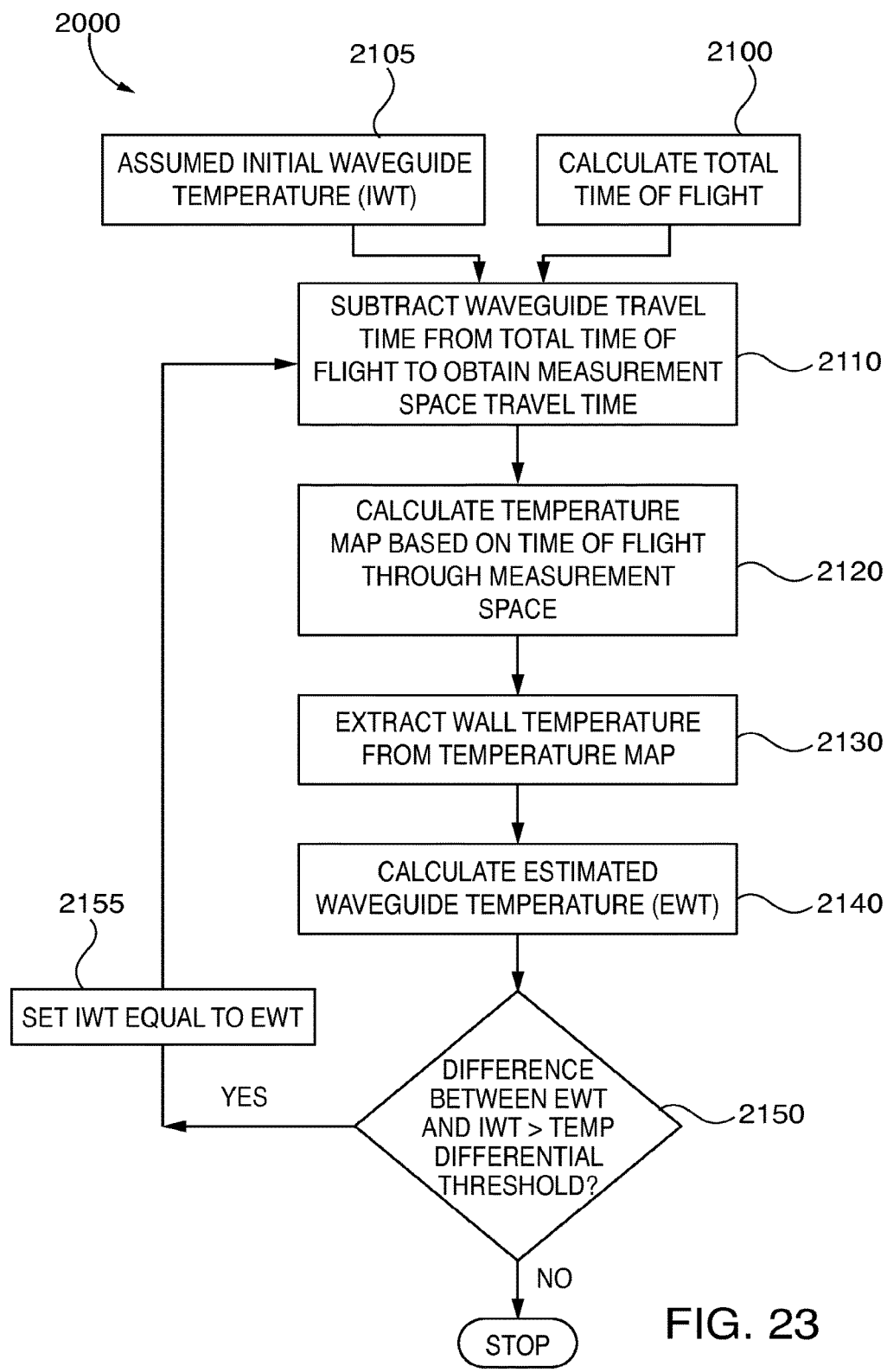
FIG. 23 is a flowchart for illustrating a method for determining a waveguide temperature in accordance with embodiments of the invention.

Referring to FIG. 23, a flowchart 2090 is shown which illustrates a method for determining a waveguide temperature in accordance with embodiments of the invention. At the beginning of the method, an assumed initial waveguide temperature 2105 for each waveguide is initially used. In an embodiment, the initial waveguide temperature 2105 is set to room temperature, although it is understood that other temperatures may be used. At Step 2100, the total time of flight is the sum of the amount of time for the acoustic signal to travel through a waveguide 2030A-2030H and the amount of time for the acoustic signal to travel through the measurement space 2010. The waveguide travel time is subtracted from the total time of flight to provide a travel time through the measurement space 2010 at Step 2110. At Step 2120, a temperature map is calculated based on the travel time through the measurement space 2010. Next, a wall temperature is extracted from the temperature map at Step 2130. At Step 2140, an estimated waveguide temperature of each waveguide 2030A-2030H is calculated based on Eq. (3):

$$\text{estWaveGuide}(tr\_i) = 0.75 \times \text{estimated\_wall\_value} \\ (\text{matching\_boundary\_portion}) + 30K \quad (3)$$

wherein "tr_i" corresponds to a transducer 2040A-2040H number associated with a boundary portion 2070A-2070H, "estWaveGuide(tr_i)" is an estimated temperature for a waveguide 2030A-2030H corresponding to the transducer number "tr_i" and "K" is the Kelvin temperature scale although it is understood that other temperatures scales may be used. The "estimated_wall_value(matching_boundary_portion)" is an estimated temperature for the boundary portion 2070A-2070H associated with the transducer.

At Step 2150, if the difference between the estimated waveguide temperature of each waveguide 2030A-2030H, (i.e. "estWaveGuide(tr_i)") from Eq. (3) and an assumed initial waveguide temperature, or an initial waveguide temperature equal to a previously calculated estimated waveguide temperature, is greater than a temperature differential threshold, the initial waveguide temperature is set equal to the estimated waveguide temperature of each waveguide 2030A-2030H ("estWaveGuide(tr_i)") at Step 2155. Thus, the initial waveguide temperature and the estimated waveguide temperature of each waveguide occur at different times during the method. The method then returns to Step 2110 and Steps 2120, 2130 and 2140 are repeated to perform another iteration of the method and obtain a new estimated waveguide temperature of each waveguide 2030A-2030H ("estWaveGuide(tr_i)").

If the conditions in Step 2150 are not met, i.e. the difference between the estimated waveguide temperature, i.e. Eq. (3) and an initial waveguide temperature is less than or equal to the temperature differential threshold, the temperature of a boundary portion 2070A-2070H of the wall 2050 and the temperature of its associated waveguide 2030A-2030H have converged and the process stops. This also indicates that the wall temperature and waveguide temperatures are relatively constant. In an embodiment, the temperature differential threshold is approximately 5° C. Aspects of the method may be implemented as an algorithm or computer program for use in the previously described tomographic mapping module 1315, computer system or other computing device.

Referring to FIG. 24, a chart 2160 is shown depicting an exemplary waveguide temperature plot 2170 for each waveguide 2030A-2030F. Each temperature plot 2170 is obtained during iteration of the method. From the chart 2160, it can be seen that each waveguide temperature begins to converge (i.e. the difference between the estimated waveguide temperature and an initial waveguide temperature as previously described becomes increasingly smaller) as the number of iterations of the method increase thereby improving the accuracy of the indicated waveguide temperature. In this example, the waveguide temperatures converge in region 2180 of the chart 2160 after approximately 30 iterations thereby indicating accurate temperatures. In an embodiment, a fast mapping algorithm may be used that iterates multiple times per measurement to allow convergence of the waveguide temperatures without substantially affecting real time capabilities of the overall system 29. This enables faster convergence of the waveguide temperatures in the event there is a large difference between the initial and estimated waveguide temperatures and faster generation of an approximate temperature map. Once the differential waveguide temperature reduces to a selected threshold the temperature map may be solved more accurately.

FIGS. 25-30 depict a sequence of exemplary temperature maps 2190, 2200, 2210, 2220, 2220 and 2240, respectively, that illustrate temperature convergence for a waveguide as the number of iterations increase. Temperature maps 2190-2240 include temperature regions 2250, 2260, 2270, 2280 whose arrangement and indicated temperature changes as the number of iterations increase, thus changing temperature distribution of the associated temperature map. An initial temperature map 2190 is shown in FIG. 25 wherein waveguide temperatures of 35, 38, 36, 30, 30, 31° C. are initially estimated for waveguides 2030A-2030F, respectively. FIGS. 26-29 illustrate iterations of the method wherein the waveguide temperatures are updated and the temperature maps change accordingly in each figure. FIG. 30 depicts a final temperature map 2240 wherein the difference between an estimated waveguide temperature and an initial waveguide temperature is less than or equal to a temperature differential threshold, i.e. the temperatures converge as previously described. In FIGS. 25-30, additional iterations (up to 45) were performed in order to show stable algorithm convergence.

Estimation of boundary and waveguide conditions is repeated only if there are significant changes so as to limit computational cost and impact on the overall system 29. That is, once the boundary and waveguide condition converge, the algorithm keeps track of the changing boundary conditions to maintain accuracy of the total map. In practice, a complete temperature map is calculated once the boundary condition and waveguide temperature converge. In an embodiment, a learned history of a relationship between waveguide temperature and a temperature map may be used to enhance the estimation of waveguide temperatures. For example, a record or data of the relationship between waveguide temperature and a temperature map from a similar gas turbine or experimental engine having similar temperature characteristics may be used to enhance estimation of waveguide temperatures. In addition, an estimated waveguide temperature obtained from a previous temperature mapping solution may be used in order to increase the speed of convergence of the waveguide temperatures. Further, constraints on possible mapping solutions such as limiting temperature ranges such as a temperature range for the waveguide or other temperature ranges, allowing only a linear combination of basis maps and others may be used to increase accuracy and speed of temperature mapping.

The current invention provides a method for automatically determining boundary and waveguide conditions and extends mapping to use the boundary and waveguide conditions. In particular, waveguide and boundary temperatures are iteratively calculated in real time without need for their actual measurement (i.e. without the need to measure temperature by using a temperature sensing device or probe) in order to obtain a true temperature map. The current invention reduces the need for instrumenting waveguides and walls and other areas to obtain boundary conditions. Further, the current invention increases the accuracy of temperature, velocity and mass flow measurement of hot gas flows.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. However, the various aspects of the present invention described more fully herein may be applied to other instances where a profile map of values in a region is determined based on average values along linear paths through the region. The invention is capable of other embodiments and of being practiced or of being carried out in various ways. While acoustic and laser sensors are discussed, other measurement techniques may be used. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for determining a waveguide temperature for at least one waveguide used in conjunction with a transceiver that generates an acoustic signal that travels through a measurement space in a hot gas flow path defined by a wall, comprising:
    calculating, by a processor, a total time of flight for the acoustic signal wherein the total time of flight includes a travel time through the measurement space and a travel time through the waveguide;
    subtracting, by the processor, the waveguide travel time from the total time of flight to obtain a measurement space travel time;
    calculating, by the processor, a temperature map based on the measurement space travel time;
    obtaining, by the processor, an estimated wall temperature from the temperature map; and
    calculating, by the processor, an estimated waveguide temperature based on the estimated wall temperature wherein the estimated waveguide temperature is determined without the use of a temperature sensing device;
    controlling, by a controller, a gas turbine combustion process based on the estimated waveguide temperature.

2. The method according to claim 1, wherein the wall is divided into a plurality of boundary portions each having an associated transceiver and adjacent waveguide wherein a temperature of each boundary portion is used to calculate a corresponding estimated waveguide temperature.

3. The method according to claim 2, wherein the estimated waveguide temperature is linearly related to the estimated wall temperature.

4. The method according to claim 1, wherein the method is performed iteratively thereby providing iterative estimation of waveguide temperatures based on estimated temperature maps.

5. The method according to claim 4, wherein a fast mapping algorithm is used that iterates multiple times per measurement to enable waveguide temperature convergence without substantially affecting real time capabilities of an associated system.

6. The method according to claim 1, wherein the temperature differential threshold is approximately 5° C.

7. A method for determining a waveguide temperature in a gas turbine, comprising the steps of:
    (a) providing at least one transceiver that generates an acoustic signal that travels through a measurement space in a hot gas flow path defined by a wall in the gas turbine, wherein the at least one transceiver includes a waveguide;
    (b) calculating, by a processor, a total time of flight for the acoustic signal wherein the total time of flight includes a travel time through the measurement space and a travel time through the waveguide;
    (c) subtracting, by the processor, the waveguide travel time from the total time of flight to obtain a measurement space travel time;
    (d) calculating, by the processor, a temperature map based on the measurement space travel time;
    (e) obtaining, by the processor, an estimated wall temperature from the temperature map;
    (f) calculating, by the processor, an estimated waveguide temperature based on the estimated wall temperature wherein when a difference between the estimated waveguide temperature and an initial waveguide temperature is greater than a temperature differential threshold, steps (c)-(e) are repeated wherein a converged waveguide temperature is determined when a difference between the estimated waveguide temperature and an initial waveguide temperature is less than or equal to the temperature differential threshold and wherein the estimated waveguide temperature is determined without the use of a temperature sensing device;
    (g) utilizing a learned history of a relationship between waveguide temperature and a temperature map to enhance estimation of waveguide temperatures;
    controlling, by a controller, a combustion process of the gas turbine utilizing the estimated waveguide temperature;
    unloading or shutting down the gas turbine when an anomaly is determined by the processor from the estimated waveguide temperature.

8. The method according to claim 7, wherein the wall is divided into a plurality of boundary portions each having an associated transceiver and adjacent waveguide wherein a temperature of each boundary portion is used to calculate a corresponding estimated waveguide temperature.

9. The method according to claim 8, wherein the estimated waveguide temperature is linearly related to the estimated wall temperature.

10. The method according to claim 7, wherein the method is performed iteratively thereby providing iterative estimation of waveguide temperatures based on estimated temperature maps.

11. The method according to claim 10, wherein the a fast mapping algorithm is used that iterates multiple times per measurement to enable waveguide temperature convergence without substantially affecting real time capabilities of an associated system.

12. The method according to claim 7, wherein the temperature differential threshold is approximately 5° C.

13. A method for determining a waveguide temperature for at least one waveguide used in conjunction with a transceiver that generates an acoustic signal that travels through a measurement space in a hot gas flow path defined by a wall, comprising:
  (a) dividing, by a processor, the wall into a plurality of boundary portions wherein a transceiver and waveguide is associated with each boundary portion;
  (b) calculating, by the processor, a total time of flight for the acoustic signal wherein the total time of flight includes a travel time through the measurement space and a travel time through the waveguide;
  (c) subtracting, by the processor, the waveguide travel time from the total time of flight to obtain a measurement space travel time;
  (d) calculating, by the processor, a temperature map based on the measurement space travel time;
  (e) obtaining, by the processor, from the temperature map an estimated temperature for each boundary portion; and
  (f) calculating, by the processor, an estimated waveguide temperature for each boundary portion wherein the estimated waveguide temperature is determined without the use of a temperature sensing device;
  controlling, by a controller, a gas turbine combustion process based on the estimated waveguide temperature.

14. The method according to claim 13, wherein the estimated waveguide temperature is linearly related to the estimated wall temperature.

15. The method according to claim 13, wherein the method is performed iteratively thereby providing iterative estimation of waveguide temperatures based on estimated temperature maps.

16. The method according to claim 15, wherein a fast mapping algorithm is used that iterates multiple times per measurement to enable waveguide temperature convergence without substantially affecting real time capabilities of an associated system.

17. The method according to claim 13, wherein the temperature differential threshold is approximately 5° C.

18. The method according to claim 13, wherein the estimated waveguide temperature is obtained by a convergence of waveguide temperatures and an estimated waveguide temperature obtained from a previous temperature mapping solution is used to increase a speed of convergence of the waveguide temperatures.

19. The method according to claim 18, wherein convergence occurs after approximately 30 iterations.

* * * * *